(12) United States Patent
Notman

(10) Patent No.: US 6,984,967 B2
(45) Date of Patent: Jan. 10, 2006

(54) MULTI-MODE SWITCHING REGULATOR

(75) Inventor: Andrew Notman, Edinburgh (GB)

(73) Assignee: Allegro Microsystems, Inc., Worcester, MA (US)

( * ) Notice: Subject to any disclaimer, the term of this patent is extended or adjusted under 35 U.S.C. 154(b) by 0 days.

(21) Appl. No.: 10/696,230

(22) Filed: Oct. 29, 2003

(65) Prior Publication Data

US 2005/0093526 A1 May 5, 2005

(51) Int. Cl.
  *G05F 1/40* (2006.01)
(52) U.S. Cl. .................................. 323/282; 323/283
(58) Field of Classification Search ............... 323/222, 323/223, 224, 282, 283, 284, 259
See application file for complete search history.

(56) References Cited

U.S. PATENT DOCUMENTS

| | | | |
|---|---|---|---|
| 5,565,761 A | 10/1996 | Hwang | |
| 6,037,755 A | 3/2000 | Mao et al. | |
| 6,166,527 A | 12/2000 | Dwelley et al. | |
| 6,191,567 B1 | 2/2001 | Sluijs | |
| 6,215,286 B1 | 4/2001 | Scoones et al. | |
| 6,348,779 B1 | 2/2002 | Sluijs | |
| 6,348,781 B1 * | 2/2002 | Midya et al. | 323/224 |

OTHER PUBLICATIONS

"Micropower, Synchronous, Buck–Boost DC–DC Converter;" A8440 Concept Datasheet: Aug. 8, 2003; Allegro Microsystems, Inc. Data Sheet; pp. 1–11.

* cited by examiner

*Primary Examiner*—Adolf Berhane
(74) *Attorney, Agent, or Firm*—Daly, Crowley, Mofford & Durkee, LLP

(57) ABSTRACT

A multi-mode switching regulator is capable of operating in a buck mode of operation, a boost mode of operation, and a buck-boost mode of operation. In the buck-boost mode of operation, the output voltage is regulated by adjusting a number of switch state transitions from a first state to a second state relative to a number of switch state transitions from the first state to a third state, and the duty cycle of each of the states is fixed from cycle to cycle in which the particular state occurs.

48 Claims, 17 Drawing Sheets

MULTI-MODE SWITCHING REGULATOR

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to switching regulators, and more particularly to switching regulators capable of operating in a buck-boost mode of operation, a buck mode of operation, and a boost mode of operation.

BACKGROUND OF THE INVENTION

As is known in the art, switching regulators provide a regulated output voltage to a load. The output voltage is regulated to be a substantially constant voltage irrespective of variations in the load and variations in the input voltage.

Conventional switching regulators are provided in at least three configurations, including, but not limited to buck, boost, and buck-boost configurations, each described below. Depending upon configuration, a conventional switching regulator can have one or more switches, and typically either one, two, or four switches. A control circuit, provided to control the switches, forms a part of the switching regulator.

Referring to FIG. 1, a prior art buck switching regulator 10 includes an optional input capacitor 12, two switches A, B, an inductor 16 having first and second ends 16a, 16b respectively, an output capacitor 14, and a control circuit 18 all coupled as shown. A load 24 is coupled to the output of the buck switching regulator 10.

The buck switching regulator 10 is adapted to receive an input voltage $V_{in}$ and to provide a regulated output voltage $V_{out}$ that is less than the input voltage $V_{in}$. The control circuit 18 provides two control signals $V_A$ and $V_B$ for controlling switches A and B, respectively. The switches A and B are turned on and off alternately such that switch A is on while switch B is off and vice versa. The term "on", as used herein, describes a closed switch and the term "off", as used herein, describes an open switch.

The conventional buck switching regulator 10 has two "states", i.e. switch conditions. In a first state, switch A is closed and switch B is open. In a second state, switch A is open and switch B is closed. The first and second states can be designated as A and B, corresponding to the closed switches in each state. A regulated output voltage $V_{out}$ is achieved by controlling the relative time spent in each of the two states, A and B.

One of ordinary skill in the art will recognize that, in an alternate embodiment, a diode (not shown) having a cathode coupled to the first end 16a of the inductor 16 and an anode coupled to ground 13 can replace switch B. In this alternate embodiment, a control circuit, similar to the control circuit 18, provides one control signal $V_A$ for turning switch A on and off.

Referring now to FIG. 2, a prior art boost switching regulator 50 includes an optional input capacitor 52, two switches C, D, an inductor 54 having first and second ends 54a, 54b respectively, an output capacitor 56, and a control circuit 58 all coupled as shown. A load 60 is coupled to the output of the boost switching regulator 50.

The boost switching regulator 50 is adapted to receive an input voltage $V_{in}$ and to provide a regulated output voltage $V_{out}$ that is greater than the input voltage $V_{in}$. The control circuit 58 provides two control signals $V_C$ and $V_D$ for controlling switches C and D, respectively. The switches C and D, are turned on and off alternately such that switch C is on while switch D is off and vice versa.

The conventional boost switching regulator 50 has two states. In a first state, switch C is closed and switch D is open. In a second state, switch C is open and switch D is closed. The first and second states can be designated as C and D. A regulated output voltage $V_{out}$ is achieved by controlling the relative time spent in each of the two states C and D.

One of ordinary skill in the art will recognize that, in an alternate embodiment, a diode (not shown) having a cathode coupled to the regulated output voltage $V_{out}$, and having an anode coupled to the second end 54b of the inductor 54 can replace switch C of FIG. 2. In this alternate embodiment, a control circuit, similar to the control circuit 58, provides one control signal $V_D$ for turning switch D on and off.

Referring now to FIG. 3, a prior art buck-boost switching regulator 90 includes an optional input capacitor 92, switches A, B, C and D, an inductor 94, an output capacitor 96, and a control circuit 98 all coupled as shown. A load 100 is coupled to the output of the buck-boost switching regulator 90.

The buck-boost switching regulator 90 is adapted to receive an input voltage $V_{in}$ and to provide a regulated output voltage $V_{out}$ for input voltages $V_{in}$ substantially equal to the output voltage $V_{out}$. The control circuit 98 provides four control signals $V_A$, $V_B$, $V_C$, and $V_D$ for controlling switches A, B, C, and D respectively. Switches A and B are turned on and off alternately such that switch A is on while switch B is off and vice versa. Similarly, switches C and D are turned on and off alternately such that switch C is on while switch D is off and vice versa.

The conventional buck-boost switching regulator has two states. In a first state, switches A and D are closed while switches B and C are open. In a second state, switches A and D are open and switches B and C are closed. The first and second states can be designated as AD and BC corresponding to the closed switches in each state. A regulated output voltage $V_{out}$ is achieved by controlling the relative time spent in each of the two states AD and BC.

One of ordinary skill in the art will recognize that, in alternate embodiments, diodes (not shown) coupled as described above in conjunction with FIGS. 1 and 2 can replace one or both of the switches B and C. In these alternate embodiments, a control circuit, similar to the control circuit 98, provides two or three control signals, rather than the four control signals $V_A$, $V_B$, $V_C$, $V_D$, for controlling the two or three switches.

Another conventional switching regulator, described in U.S. Pat. No. 6,166,527 to Dwelley et al., provides a buck-boost mode for which there are three states, designated as AC, BC and AD, each identifying closed switches during a respective state. In order to provide a regulated output voltage, Dwelley et al. controls duty cycles of the three states AC, BC, and AD, adjusting a period of time spent in each state during each cycle of the switching regulator, where a cycle of the switching regulator will be understood to correspond to a cycle of a periodic waveform associated with the switching regulator.

An important consideration in switching regulator design is efficiency. It will be appreciated by those of ordinary skill in the art that efficiency is lost in a switching regulator when switches, for example switches A, B, C, and D of FIG. 3, change state. This is due in part to capacitance associated with each switch, which causes high frequency components of the control signals to be shunted to ground or elsewhere during transitions of the control signals.

It would, therefore, be desirable to provide a switching regulator having improved efficiency.

SUMMARY OF THE INVENTION

The present invention provides a high efficiency multi-mode switching regulator having the ability to operate in a buck mode, a boost mode, or a buck-boost mode of operation.

In accordance with the present invention, a method of controlling a switching regulator includes generating a feedback signal proportional to the output voltage and generating first, second, third and fourth control signals to control first, second, third, and fourth switches, wherein the first, second, third, and fourth switches are coupled about an inductor in an H-bridge arrangement. The control signals provide a first state in which the first and third switches are closed and the second and fourth switches are open, a second state in which the second and third switches are closed and the first and fourth switches are open, and a third state in which the first and fourth switches are closed and the second and third switches are open. In a buck-boost mode of operation, the method includes adjusting a number of state transitions from the first state to the second state relative to a number of state transitions from the first state to the third state in response to the feedback signal.

In accordance with another aspect of the present invention, a method of controlling a switching regulator includes generating a feedback signal proportional to the output voltage, generating a periodic analog waveform, and generating first, second, third and fourth control signals to control first, second, third, and fourth switches, wherein the first, second, third, and fourth switches are coupled about an inductor in an H-bridge arrangement. The control signals provide a first state in which the first and third switches are closed and the second and fourth switches are open, a second state in which the second and third switches are closed and the first and fourth switches are open, and a third state in which the first and fourth switches are closed and the second and third switches are open. In a buck-boost mode of operation, a duty cycle of the first state within all periods of the periodic analog waveform corresponds to a first predetermined value, a duty cycle of the second state within periods of the periodic analog waveform in which the second state occurs corresponds to a second predetermined value, and a duty cycle of the third state within periods of the periodic analog waveform in which the third state occurs corresponds to a third predetermined value. In one particular embodiment, the first predetermined value is on the order of 85%, and the second and third predetermined values are each on the order of 15%.

In accordance with another aspect of the present invention, a method of controlling a switching regulator includes generating a feedback signal proportional to the output voltage, generating a periodic analog waveform, and generating first, second, third and fourth control signals to control first, second, third, and fourth switches, wherein the first, second, third, and fourth switches are coupled about an inductor in an H-bridge arrangement. The method provides a first state in which the first and third switches are closed and the second and fourth switches are open, a second state in which the second and third switches are closed and the first and fourth switches are open, and a third state in which the first and fourth switches are closed and the second and third switches are open. In a buck-boost mode of operation, state transitions consist of a transition from the first state to the second state and a transition from the second state to the first state in a first period of the periodic analog waveform and from the first state to the third state and from the third state to the first state in a second period of the periodic analog waveform.

In accordance with another aspect of the present invention, a method of controlling a switching regulator includes generating a feedback signal proportional to the output voltage, generating a periodic analog waveform, and generating first, second, third and fourth control signals to control first, second, third, and fourth switches, wherein the first, second, third, and fourth switches are coupled about an inductor in an H-bridge arrangement. The method provides a first state in which the first and third switches are closed and the second and fourth switches are open, a second state in which the second and third switches are closed and the first and fourth switches are open, and a third state in which the first and fourth switches are closed and the second and third switches are open. During a single period of the periodic analog waveform, switches are in a selected two of the first, second, and third states.

In accordance with another aspect of the present invention, a control circuit for controlling a switching regulator includes a feedback amplifier for generating a feedback signal proportional to the regulated output voltage, a digital waveform generator responsive to the feedback signal for providing a digital waveform having a pulse rate proportional to the feedback signal, an analog waveform generator for generating a periodic analog waveform having a predetermined amplitude, and at least one comparator for comparing the periodic analog waveform to at least one fixed voltage and for providing a respective comparison output signal. The control circuit also includes logic circuitry responsive to the comparison output signal, and having first, second, third, and fourth control outputs coupled to the first, second, third, and fourth switches respectively, for providing a first state in which the first and third switches are closed and the second and fourth switches are open, a second state in which the second and third switches are closed and the first and fourth switches are open, and a third state in which the first and fourth switches are closed and the second and third switches are open. In a buck-boost mode of operation, the logic circuitry is adapted to adjust a number of state transitions from the first state to the second state relative to a number of state transitions from the first state to the third state in response to the feedback signal.

With the above-described methods and circuit, a high efficiency switching regulator is provided which operates in the buck mode when the input voltage is greater than the output voltage, the boost mode when the input voltage is less than the output voltage and the buck-boost mode when the input voltage is close to the output voltage. Further, during the buck-boost mode of operation, only two of the four regulator switches are turned on or off in a given cycle, while the remaining two switches stay either on or off.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the switching regulator of the present invention, some introductory concepts and terminology are explained. As used herein, the term "buck-boost mode" refers to a mode of operation of a switching regulator used to provide a regulated output voltage when an input voltage to the switching regulator is substantially equal to the regulated output voltage from the switching regulator. Also, as used herein, the term "buck mode" refers to a mode of operation of a switching regulator used to provide the regulated output voltage when the input voltage to the switching regulator is greater than the regulated output voltage from the switching regulator. Furthermore, as used herein, the term "boost mode" refers to a mode of operation of a switching regulator used to provide the regulated output voltage when the input voltage to the switching regulator is less than the regulated output voltage from the switching regulator.

Also, as used herein, a "state" refers to a position (open or closed) of one or more switches associated with a switching regulator. States are designated herein by closed switches only, and from knowledge of the closed switches, open switches can easily be understood. For example, a switching regulator having four switches A, B, C, D can have a state AC, indicating that switches A and C are closed and switches B and D are open. The switching regulator can also have, for example, a state A, indicating that only switch A is closed and switches B, C, and D are open.

Figure 4:
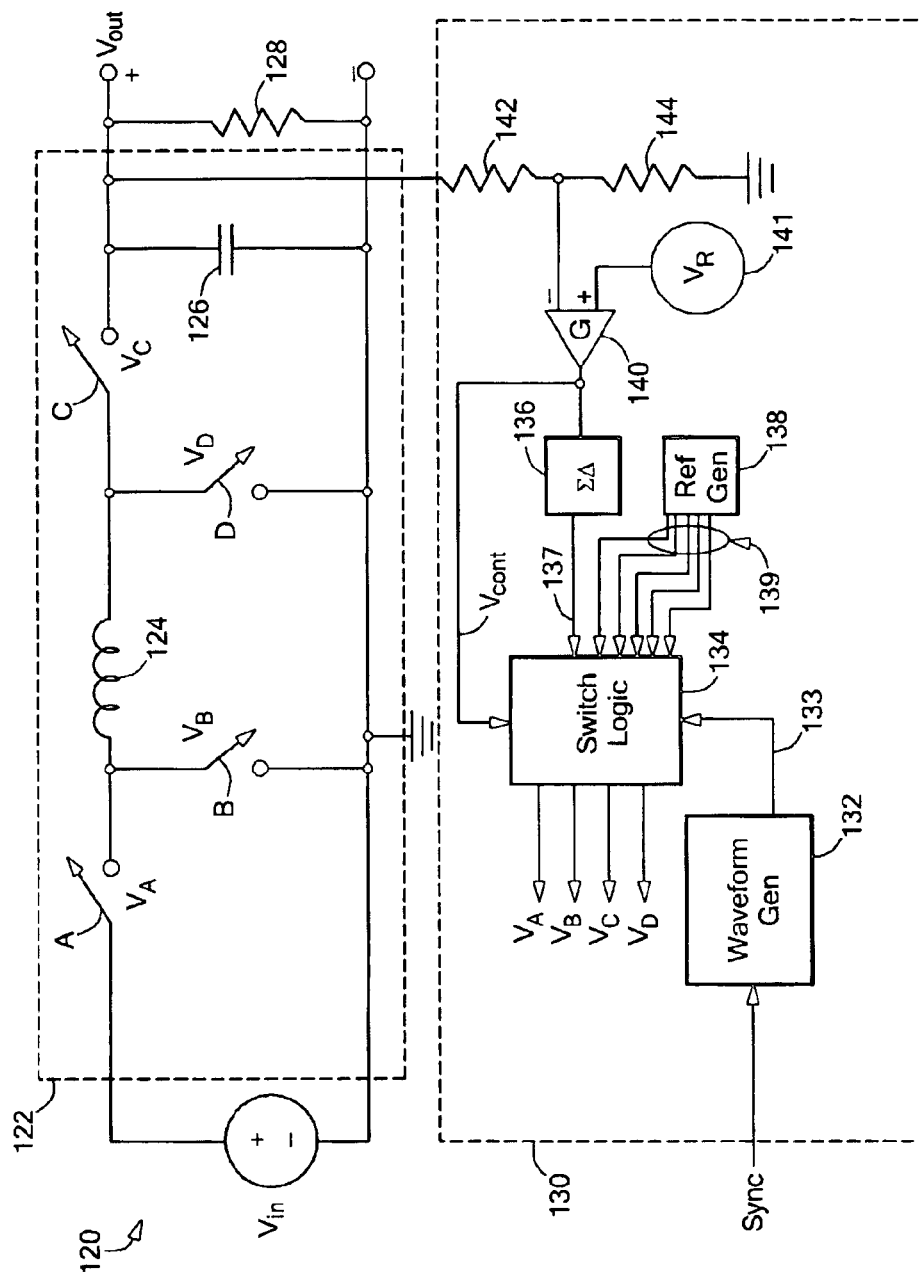
FIG. 4 is a circuit diagram of a switching regulator in accordance with the present invention.

Referring now to FIG. 4, a switching regulator 120 in accordance with the present invention includes a switching circuit 122 and a control circuit 130. The switching circuit 122 includes four switches A, B, C, D, an inductor 124, and an output capacitor 126, all coupled as shown. A load 128 is coupled to an output of switching regulator 120 at which a regulated output voltage $V_{out}$ is provided.

The control circuit 130 includes a waveform generator 132 for generating a periodic waveform 133, a sigma-delta (ΣΔ) converter 136 for generating a digital waveform 137, and an error amplifier 140 for generating an error signal (feedback signal) VCONT, all coupled to a switch logic circuit 134 as shown. A reference generator 141 provides a stable DC voltage to an input node of the error amplifier 140. A reference generator 138 provides several DC reference voltages 139 to switch logic circuit 134. The reference generator 138 is described in more detail in conjunction with FIGS. 5–9. The control circuit 130 also includes first and second resistors 142, 144 respectively, forming a voltage divider. In one particular embodiment, the first and second resistors 142, 144 are discrete resistors having a low temperature coefficient. In the illustrative embodiment, the waveform generator 132 generates a sawtooth waveform 133. In other embodiments, the waveform generator 132 can provide other periodic analog waveforms, for example, a periodic triangle waveform.

In operation, the error amplifier 140 generates the error signal VCONT as a feedback signal indicative of the amount by which the output voltage $V_{out}$ differs from an ideal output voltage. The error signal VCONT is received by the sigma-delta converter 136, which provides the digital output signal 137 having a pulse rate that varies in response to the error signal VCONT. The switch logic circuit 134 receives the error signal VCONT, the output 137 from the sigma-delta converter 136, the periodic sawtooth waveform 133, and the reference voltages 139, and provides four control signals $V_A$, $V_B$, $V_C$ and $V_D$ for controlling switches A, B, C and D, respectively. Switches A and B are turned on and off alternately such that switch A is on while switch B is off and vice versa. Similarly, switches C and D are turned on and off alternately such that switch C is on while switch D is off and vice versa.

As described more fully in conjunction with FIG. 9 below, the first, second, third, and fourth switches A, B, C, D are controlled by the control circuit 130 in response to the feedback signal VCONT to provide a first state in which the first and third switches A, C are closed and the second and fourth switches B, D are open (also referred to herein as state AC), a second state in which the second and third switches B, C are closed and the first and fourth switches A, D are open (also referred to herein as state BC), and a third state in which the first and fourth switches A, D are closed and the second and third switches B, C are open (also referred to herein as state AD).

As described more fully below, in the buck-boost mode of operation, the output voltage is regulated by adjusting a number of state transitions from the first state, AC, to the second state, BC, relative to a number of state transitions from the first state, AC, to the third state, AD, in response to the feedback signal VCONT. Also in the buck-boost mode of operation, the duty cycle of the first state AC is fixed within all periods of the periodic sawtooth waveform and the duty cycle of the second state BC and the duty cycle of the third state AD are fixed within periods of the periodic sawtooth waveform in which the second and third states occur. In one illustrative embodiment, the duty cycle of the first state is on the order of eighty five percent and the duty cycle of each of the second and third states is on the order of fifteen percent. However, in other embodiments, the duty cycle of the first state can be selected in the range of fifty five to ninety-eight percent, and the duty cycle of each of the second and third states can be selected to be in the range of forty-five to two percent. Also as described more fully below, a further characteristic of the buck-boost mode of operation is that state transitions consist of a transition from the first state to the second state and a transition from the second state to the first state during a first period of the periodic sawtooth waveform 133 and consist of a transition from the first state to the third state and from the third state to the first state during a second period of the periodic sawtooth waveform 133.

The switching regulator 120 is adapted to receive an input voltage $V_{in}$ and to provide the regulated output voltage $V_{out}$ when $V_{in}$ is greater than $V_{out}$ during a buck mode of operation, when $V_{in}$ is less than $V_{out}$ during a boost mode of operation, or when $V_{in}$ is substantially equal to $V_{out}$ during a buck-boost mode of operation. The selection of the mode of operation is controlled by the control circuit 130 in response to the error voltage VCONT.

For example, the switching regulator 120, providing a regulated output voltage $V_{out}$ of 3.3 volts, operates in a buck mode for input voltages $V_{in}$ within a range of approximately 5.5 volts to 3.73 volts. For another example, the switching regulator 120, providing a regulated output voltage $V_{out}$ of 3.3 volts, operates in a boost mode for input voltages $V_{in}$ within a range of approximately 2.5 volts to 2.92 volts. For another example, the switching regulator 120, providing a regulated output voltage $V_{out}$ of 3.3 volts, operates in a buck-boost mode for input voltages $V_{in}$ within a range of approximately 2.92 volts to 3.73 volts. However, other output voltages and other input voltage ranges are also possible with this invention.

Figure 1:
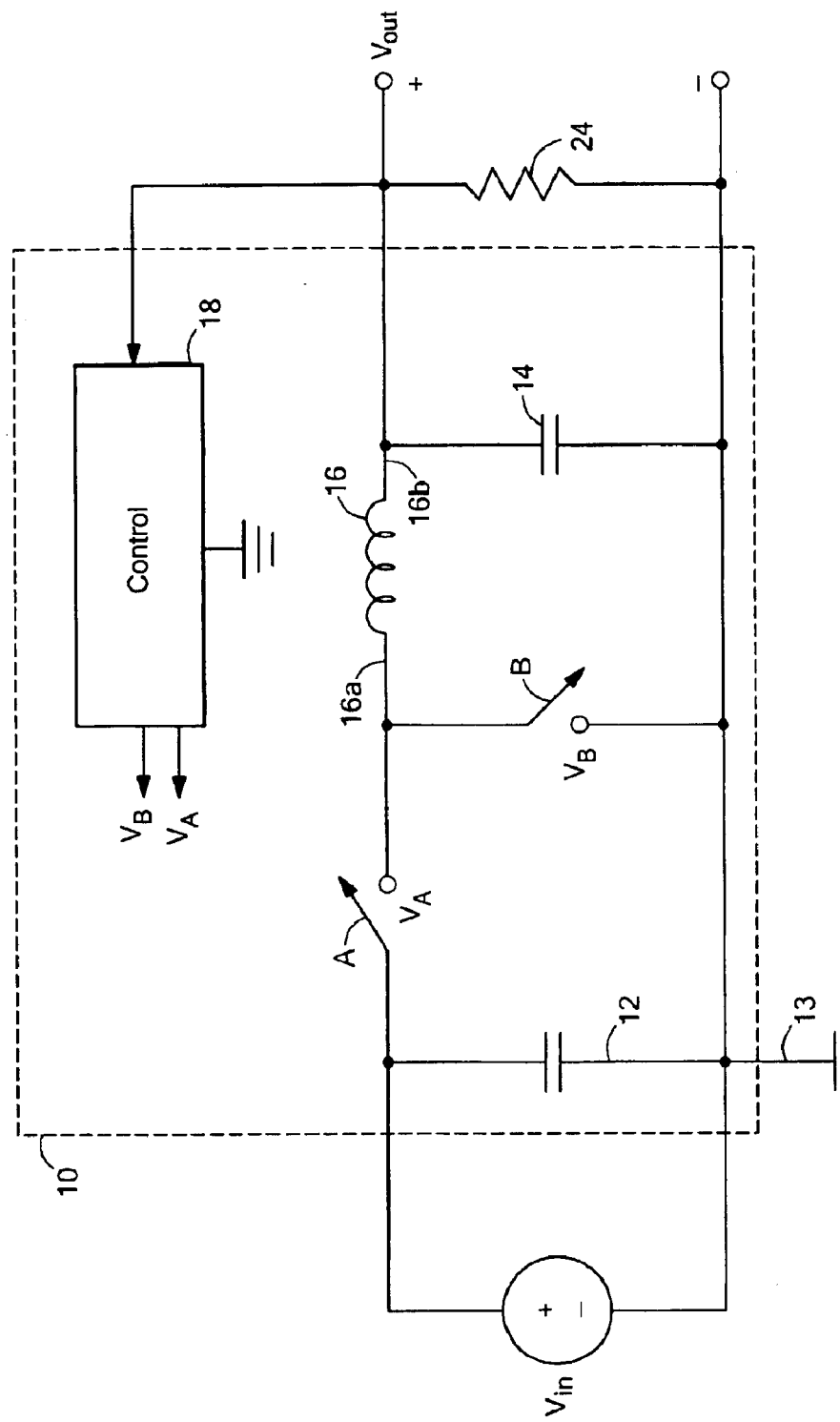
FIG. 1 is a circuit diagram of a prior art buck switching regulator.
Figure 2:
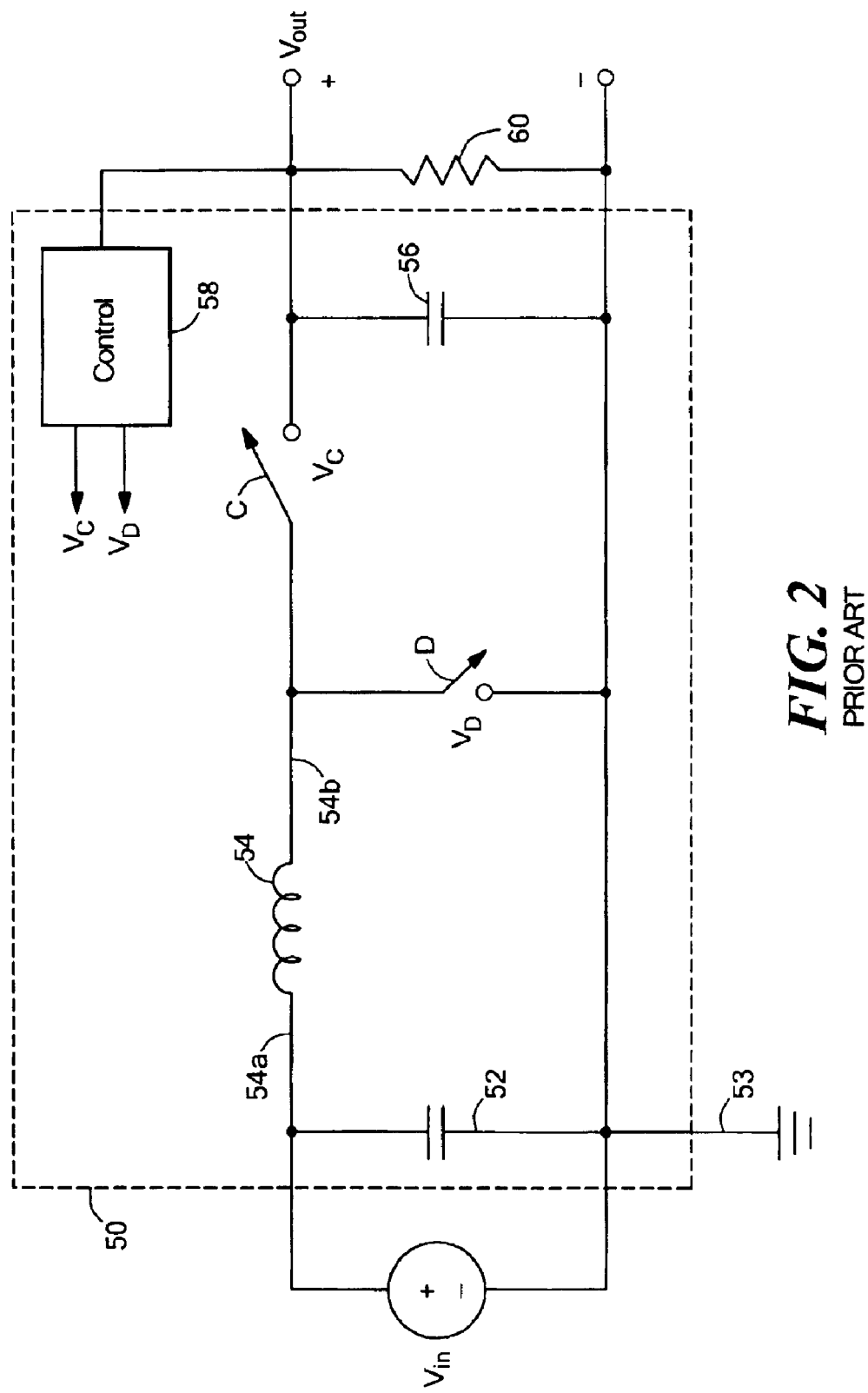
FIG. 2 is a circuit diagram of a prior art boost switching regulator.
Figure 3:
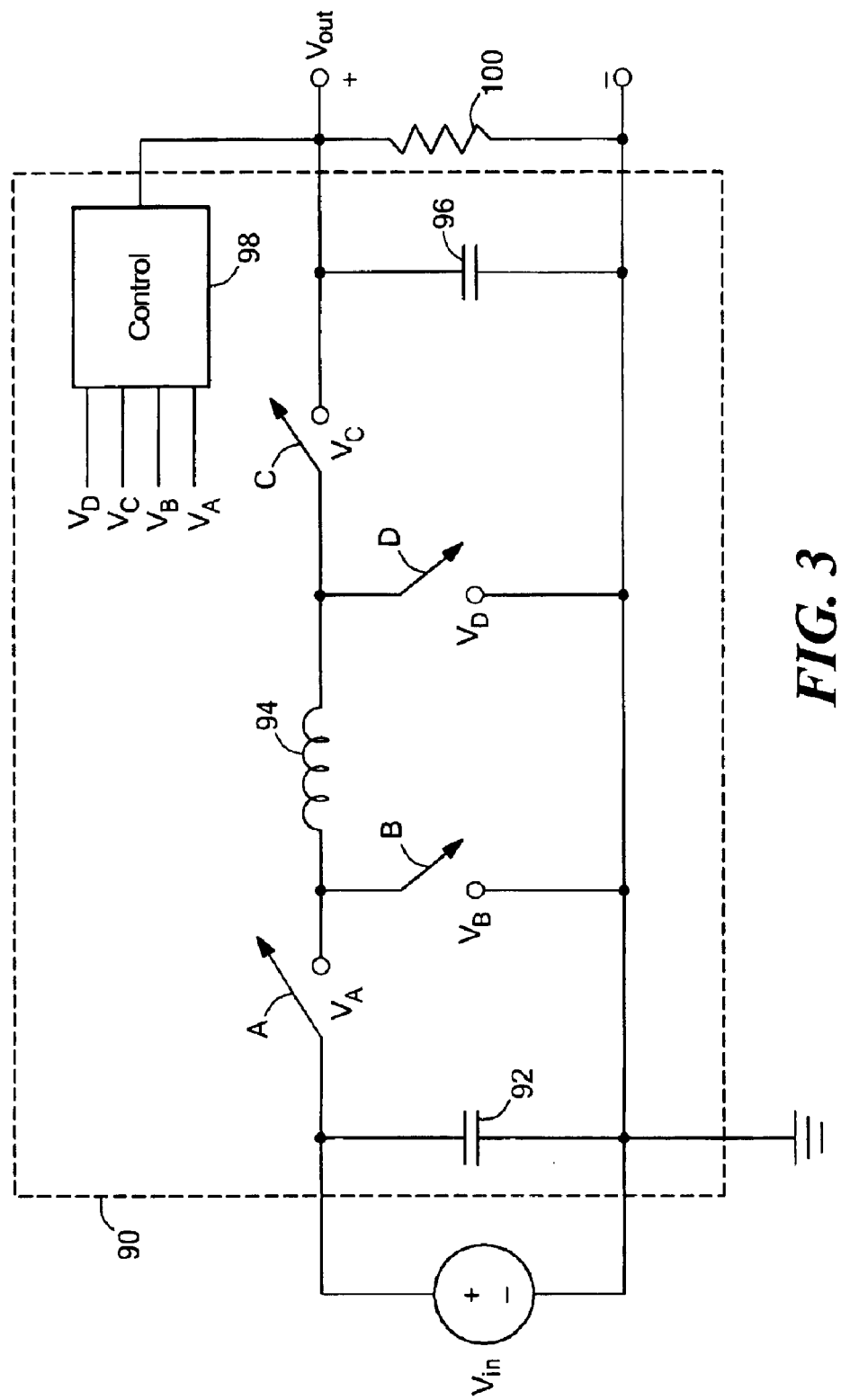
FIG. 3 is a circuit diagram of a prior art buck-boost switching regulator.
Figure 5:
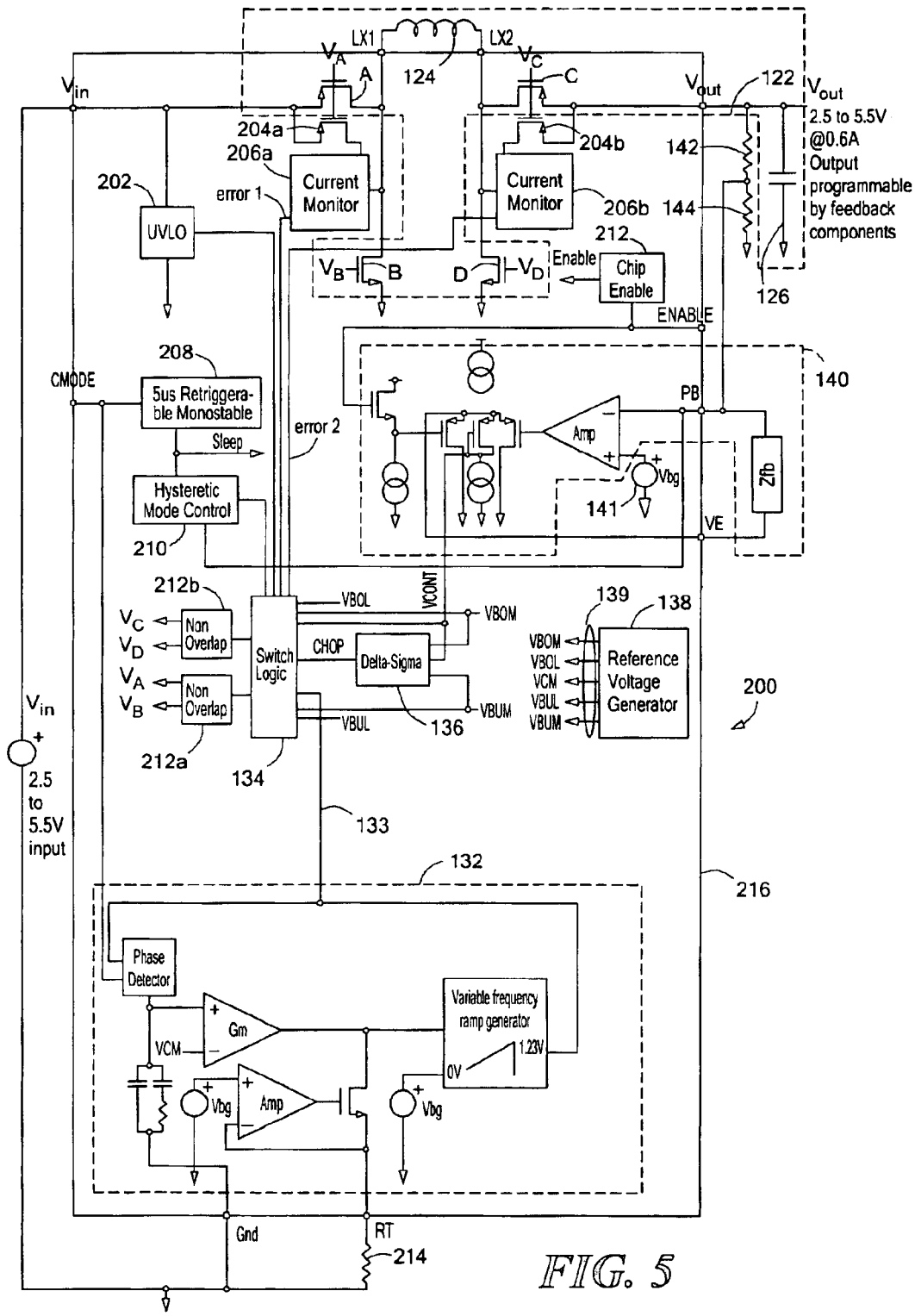
FIG. 5 is a more detailed circuit diagram of the switching regulator of FIG. 4.

Referring now to FIG. 5, in which like elements of FIG. 4 are shown having like reference designations, a switching regulator 200, which can be the same as or similar to switching regulator 120 of FIG. 4, includes the switching circuit 122, having switches A, B, C, and D, the inductor 124, and the output capacitor 126. The illustrated switches A, B, C, and D are shown as FET devices. It will be appreciated by those of ordinary skill in the art that, in other embodiments, switch B and/or C may be replaced with a diode as described above in conjunction with FIG. 3. The switching circuit 122 is coupled to the input voltage $V_{in}$ and generates the regulated output voltage $V_{out}$. All other elements of switching regulator 200 correspond to elements of the control circuit 130 of FIG. 4, including the error amplifier 140 for providing the error signal VCONT, the reference generator 141, the reference generator 138 for providing the reference voltages 139 (VBOM, VBOL, VCM, VBUL, and VBUM), switch logic circuit 134, the sigma-delta converter 136, and the waveform generator 132 for providing the periodic waveform 133. The switch logic circuit 134 is shown in greater detail in FIG. 10.

The box labeled 216 denotes the boundary of an integrated circuit (IC) with elements within the box provided on the IC and elements outside of the box being external to the IC and electrically connected to the IC through pins. It will be appreciated by those of ordinary skill in the art that the boundary between IC elements and external elements may be varied.

The elements of the periodic sawtooth waveform generator 132 provide a phase locked loop, able to synchronize the periodic sawtooth waveform 133 to an external synchronizing signal coupled to a CMODE pin. When no synchronizing signal is provided, the periodic sawtooth generator 132 generates the periodic sawtooth waveform 133 at a predetermined frequency as set by an external resistor 214. It will be appreciated by those of ordinary skill in the art that the illustrated elements of waveform generator 132 represent but one topology with which a phase locked loop can be realized and that other phase locked loop arrangements are possible.

In one particular embodiment the periodic sawtooth waveform 133 has an amplitude that spans from zero volts to 1.23 volts, with a frequency of 1 MHz. Also, in one particular embodiment, VBOM is 0.710 volts, VBOL is 0.689 volts, VCM is 0.617 volts, VBUL is 0.545 volts, and VBUM is 0.525 volts.

The error amplifier 140 provides an error signal VCONT proportional to the difference between the output voltage $V_{out}$ and reference voltage 141. The transfer function of the error amplifier 140 can be adjusted with an external impedance Zfb. The error amplifier 140 is also responsive to a signal from a chip enable circuit 212, which is used to turn switching regulator 200 on or off in response to an ENABLE signal. The switches and current sources at the output of the error amplifier are to allow for the provision of a soft-start circuit whereby the amplifier output is artificially held lower than it would normally want to, so that the regulated output comes up slowly and the input does not reach current limit when charging the output capacitance. The configuration is wired—or so the lowest of the amplifier output and the level-shifted version of the enable input (also the pin that doubles for the soft-start) takes priority. The "diode-connected" PMOS device is provided to match the VCONT output to the output of the error amplifier.

A transistor 204a, in combination with a current monitor circuit 206a, monitors the amount of current passing through switch A. Similarly a transistor 204b, in combination with a current monitor circuit 206b, monitors the amount of current passing through switch C. The current monitor circuits 206a, 206b provide error signals error1, error2, respectively, to switch logic circuit 134, which are used to force switching regulator 200 into particular states if an excessive amount of current is detected flowing through switches A and/or C. The error conditions are discussed in greater detail in conjunction with FIGS. 9 and 10.

A retriggerable monostable (one-shot) circuit 208 and a hysteretic mode control circuit 210 provide switching regulator 200 with an ability to operate in a non-periodic mode under certain conditions, for example, if the load current generated by switching regulator 200 is very low, in which case, switching regulator 200 only needs to perform switch state transitions sporadically.

A low voltage (UVLO) circuit 202 generates a low-voltage signal in response to an input voltage $V_{in}$ which is below a predetermined threshold. The low-voltage signal is provided to switch logic circuit 134 in order to force switching regulator 200 into a state corresponding to an open circuit when a low input voltage $V_{in}$ is detected. Non-overlap circuits 212a, 212b assure that switches A and B as well as switches C and D, respectively, operate in a "break-before-make" fashion.

Figure 6:
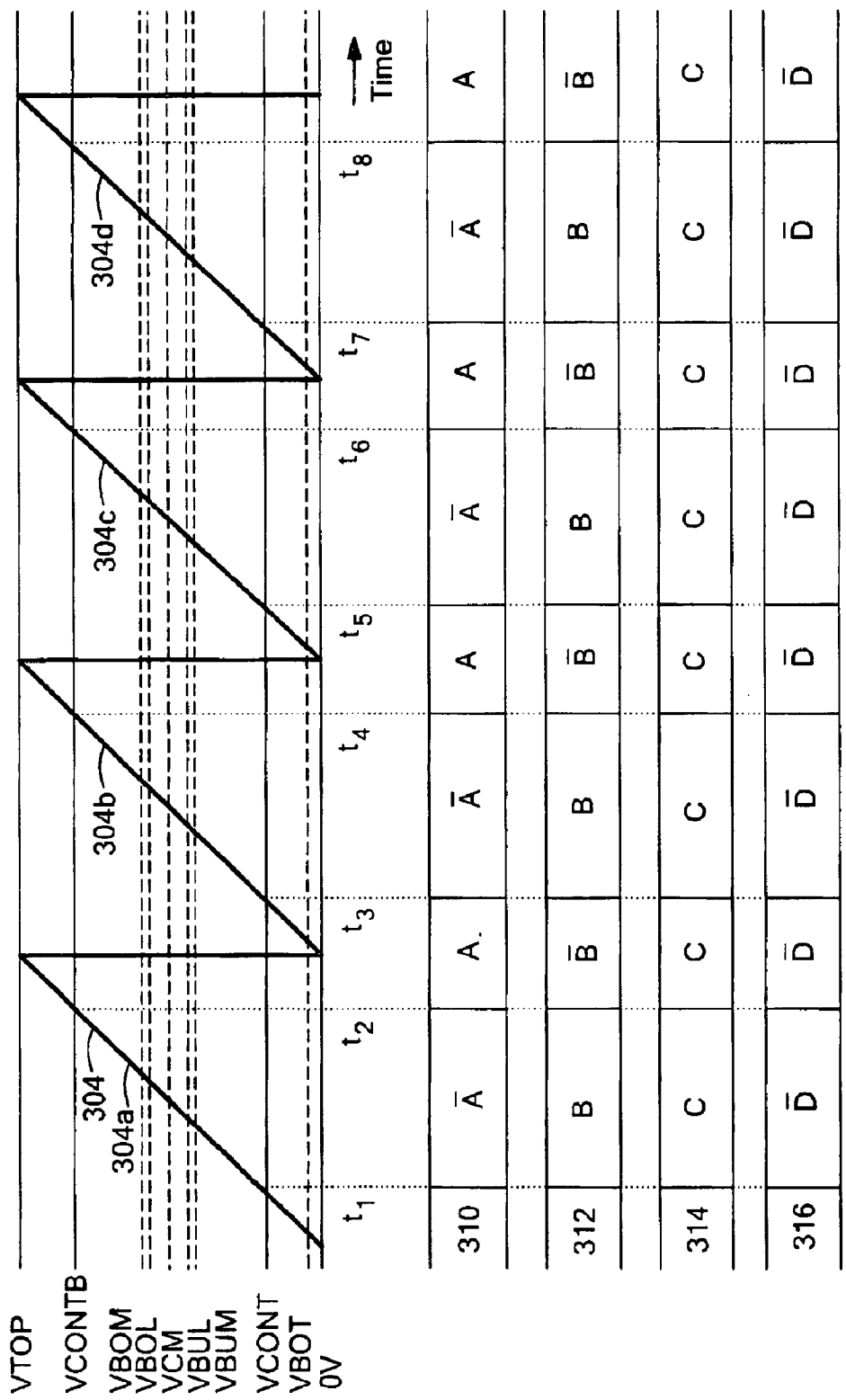
FIG. 6 is a pictorial showing a periodic sawtooth waveform and switch operations associated with the switching regulator of FIGS. 4 and 5 when operated in a buck mode.

Referring now to FIG. 6, the buck mode of operation will be described. A periodic sawtooth waveform 304 corresponding to the periodic sawtooth waveform 133 of FIGS. 4 and 5 is shown in relation to DC voltages VTOP, VBOM, VBOL, VCM, VBUL, VBUM, VBOT, 0V. Voltage VCONT corresponds to the error signal VCONT shown in FIGS. 4 and 5. Voltage VCONTB is an inverse of the voltage VCONT taken about the central or common mode voltage VCM. The inversion is further described in conjunction with FIG. 10 below. Several exemplary cycles 304a–304d of the sawtooth waveform 133 are shown. Four rows 310–316 are shown to illustrate conditions of the four switches A–D (FIGS. 4, 5), respectively. Use of the letter designation of a switch indicates a closed switch and use of a letter designation having a bar indicates an open switch (e.g., "A" indicates a switch is closed and "$\overline{A}$" indicates a switch is open).

Times t1, t3, t5, and t7 correspond to the times at which the periodic sawtooth waveform 304 crosses the lower of VCONT and VCONTB, which is here VCONT. Times t2, t4, t6, and t8 correspond to the times at which the periodic sawtooth waveform 304 crosses the greater of VCONT and VCONTB, which is here VCONTB.

When VCONT is below the reference voltage VBUL as shown, the regulator operates in a buck mode of operation. This condition is achieved when the input voltage $V_{in}$ (FIGS. 4, 5) is greater than the regulated output voltage $V_{out}$ (FIGS. 4, 5). In the buck mode of operation, between times t1 and t2, switch A (FIGS. 4 and 5) is open as denoted by $\overline{A}$, switch B is closed as denoted by B, switch C is closed as denoted by C, and switch D is open as denoted by $\overline{D}$. Therefore, between the times t1 and t2, the switch state is BC, corresponding to closed switches B and C. Between times t2 and t3, switch A is closed as denoted by A, switch B is open as denoted by $\overline{B}$, switch C is closed as denoted by C, and switch D is open as denoted by $\overline{D}$. Therefore, between times t2 and t3, the switch state is AC, corresponding to closed switches A and C. In others of the time periods t3–t4, t4–t5, t5–t6, t6–t7, and t7–t8, as shown, switch states alternate between BC and AC to provide the buck mode of operation.

In operation, as the error signal VCONT increases (and the corresponding inverted error voltage VCONTB decreases), the periods t1–t2, t3–t4, t5–t6, and t7–t8 tend to decrease, resulting in less time spent in switch state BC. Also, the periods t2–t3, t4–t5, and t6–t7 tend to increase, resulting in more time spent in switch state AC. Therefore, when operating in the buck mode of operation, the error signal VCONT determines the relative amount of time during a given cycle of the periodic waveform 304, or the duty cycle, spent in each of the two switch states BC and AC.

Figure 7:
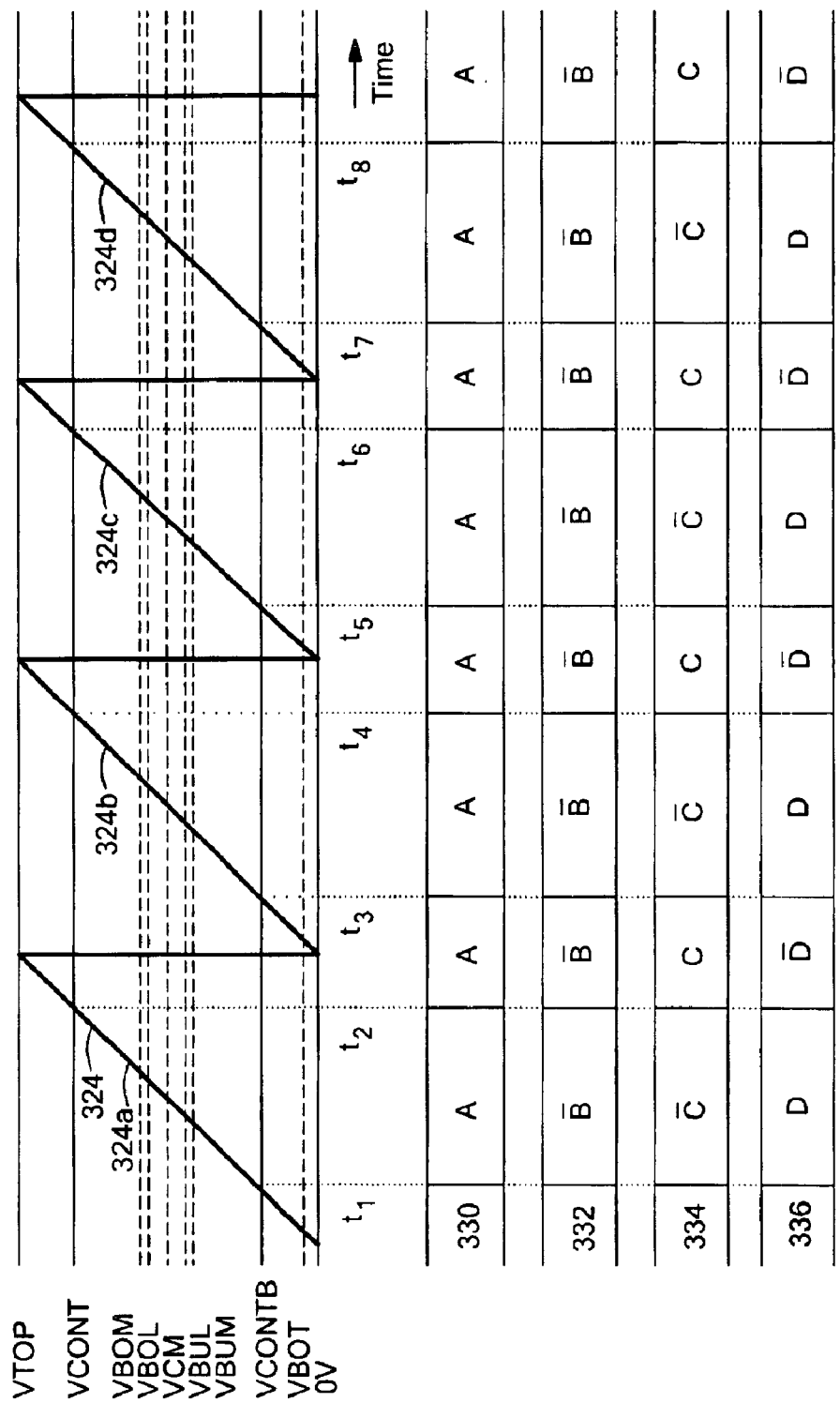
FIG. 7 is a pictorial showing a periodic sawtooth waveform and switch operations associated with the switching regulator of FIGS. 4 and 5 when operated in a boost mode.

Referring now to FIG. 7, the boost mode of operation will be described. Here again, several illustrative cycles 324a–324d of a periodic sawtooth waveform 324 corresponding to the periodic sawtooth waveform 133 of FIGS. 4 and 5 are shown in relation to DC voltages VTOP, VBOM, VBOL, VCM, VBUL, VBUM, VBOT, 0V. The voltage VCONT is the error voltage corresponding to error signal VCONT shown in FIGS. 4 and 5. The voltage VCONTB is an inverse of the error voltage VCONT taken about the central voltage VCM. Four rows 330–336 illustrate conditions of the four switches A–D, respectively (FIGS. 4, 5).

The times t1, t3, t5, and t7 correspond to the times at which the periodic sawtooth waveform 324 crosses the lower of VCONT and VCONTB, which is here VCONTB. The times t2, t4, t6, and t8 correspond to the times at which the periodic sawtooth waveform 324 crosses the greater of VCONT and VCONTB, which is here VCONT.

When VCONT is above the reference voltage VBOL as shown, the regulator operates in a boost mode of operation. This condition is achieved when the input voltage $V_{in}$ (FIGS. 4, 5) is less than the regulated output voltage $V_{out}$ (FIGS, 4, 5). In the boost mode of operation, between times t1 and t2, the switch state is AD corresponding to switches A and D being closed. Between times t2 and t3 the switch state is AC, corresponding to the switches A and C being closed. In others of the time periods t3–t4, t4–t5, t5–t6, t6–t7, and t7–t8, as shown, switch states alternate between AD and AC to provide the boost mode of operation.

In operation, as the error signal VCONT increases (and the corresponding inverted error signal VCONTB decreases), the periods t1–t2, t3–t4, t5–t6, and t7–t8 tend to increase, resulting in more time spent in switch state AD. Also, the periods t2–t3, t4–t5, and t6–t7 tend to decrease, resulting in less time spent in switch state AC. Therefore, the error signal VCONT determines the relative amount of time during a given cycle of the periodic waveform 324, or the duty cycle, spent in each of the two switch states AD and AC.

Figure 8:
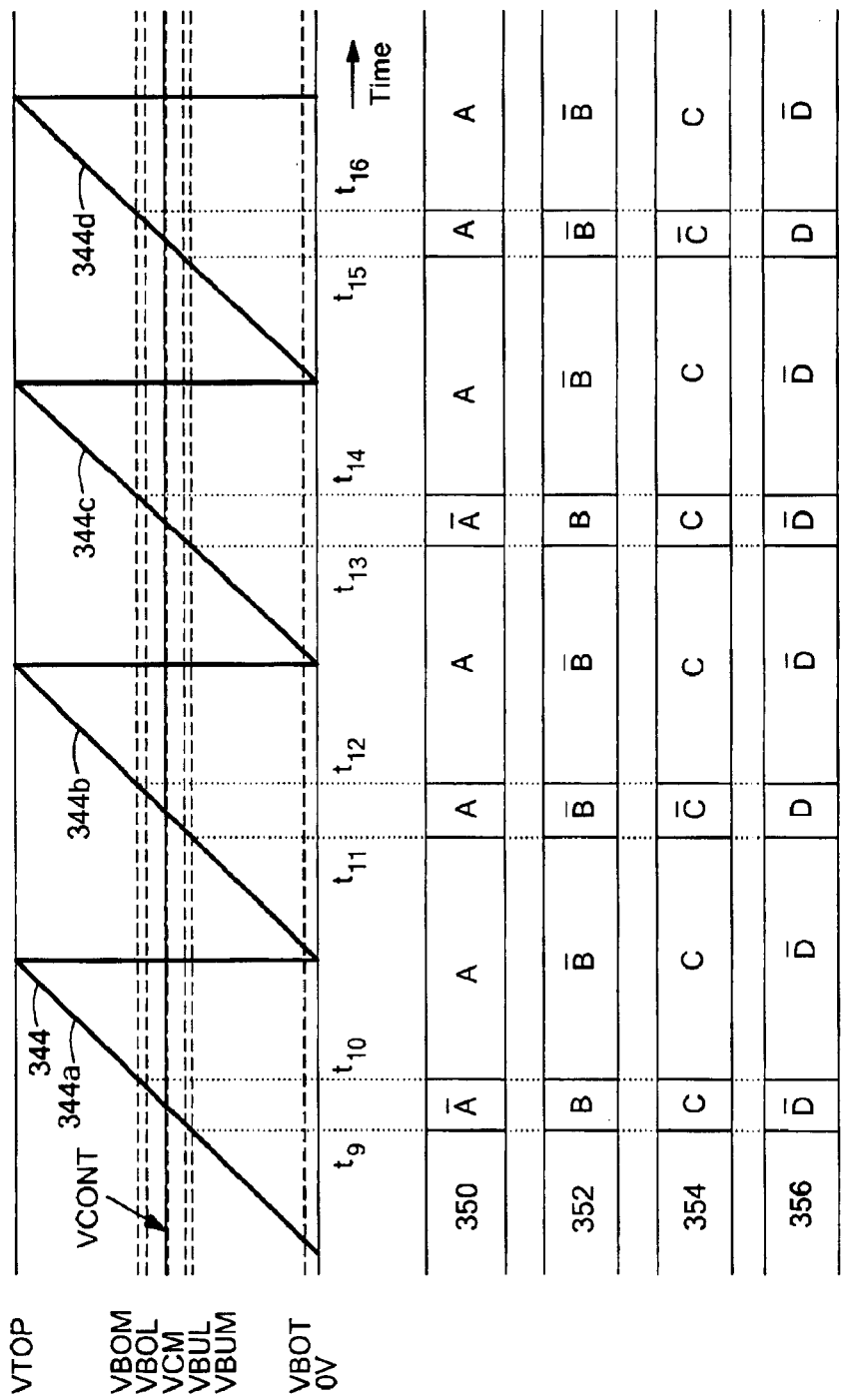
FIG. 8 is a pictorial showing a periodic sawtooth waveform and switch operations associated with the switching regulator of FIGS. 4 and 5 when operated in a buck-boost mode with an error amplifier output voltage at a first level.

Referring now to FIG. 8, the buck-boost mode of operation will be described. Again, several cycles 344a–344d of a periodic sawtooth waveform 344 corresponding to the periodic sawtooth waveform 133 of FIGS. 4 and 5, are shown in relation to DC voltages VTOP, VBOM, VBOL, VCM, VBUL, VBUM, VBOT, 0V. The voltage VCONT is an error voltage corresponding to the error signal VCONT shown in FIGS. 4 and 5. Four rows 350–356 illustrate conditions of the four switches A–D, respectively (FIGS. 4, 5).

Times t9, t11, t13, and t15 correspond to the times at which the periodic sawtooth waveform 344 crosses the DC reference voltage VBUM. Times t10, t12, t14, and t16 correspond to the times at which the periodic sawtooth waveform 344 crosses the DC reference voltage VBOM.

When error voltage VCONT is between the reference voltages VBOL and VBUL as shown, the regulator operates in a buck-boost mode of operation. This condition occurs when the input voltage $V_{in}$ (FIGS. 4, 5) is substantially equal to the regulated output voltage $V_{out}$ (FIGS. 4, 5). In FIG. 8, the error voltage VCONT is substantially equal to the reference voltage VCM, corresponding to an output voltage $V_{out}$ substantially equal to a desired output voltage $V_{out}$. In the buck-boost mode of operation, and in particular when VCONT is substantially equal to VCM, between times t9 and t10, the switch state is BC corresponding to closed switches B and C. Between times t10 and t11, the switch state is AC, corresponding to closed switches A and C. Between times t11 and t12, the switch state is AD, corresponding to closed switches A and D. In others of the time periods t12–t13, t13–t14, t14–t15, and t15–t16, as shown, the switch states are AC, BC, AC, and AD. This pattern of switch states AC, BC, AC, and AD repeats for further cycles (not shown) of the periodic waveform 344 for the conditions where $V_{in}$ is substantially equal to $V_{out}$.

In operation, as the error signal VCONT increases within the range of VBOL and VBUL, the intervals t9–t10, t10–t11, t11–t12, t12–t13, t13–t14, t14–t15, and t15–t16 do not change. Therefore, the error signal VCONT does not alter the relative amount of time in a given cycle of the waveform 344, or the duty cycle, spent in each of the three switch states BC, AC, and AD. Instead, the duty cycle is fixed by the slope of the periodic sawtooth signal 344 and by the DC reference voltages VBOM and VBUM.

In one particular embodiment, the duty cycle of the AC state is approximately eighty-five percent of each cycle of the waveform 344 and the duty cycle of each of the BC and the AD states is approximately fifteen percent of any cycle in which they occur. However, in other embodiments, the duty cycle of the AC state is in a range of fifty-five to ninety-eight percent and the duty cycle of the BC and AD states are in the range of two to forty-five percent accordingly. Also, in other embodiments, the duty cycle of the BC and AD states do not equal each other.

Figure 8A:
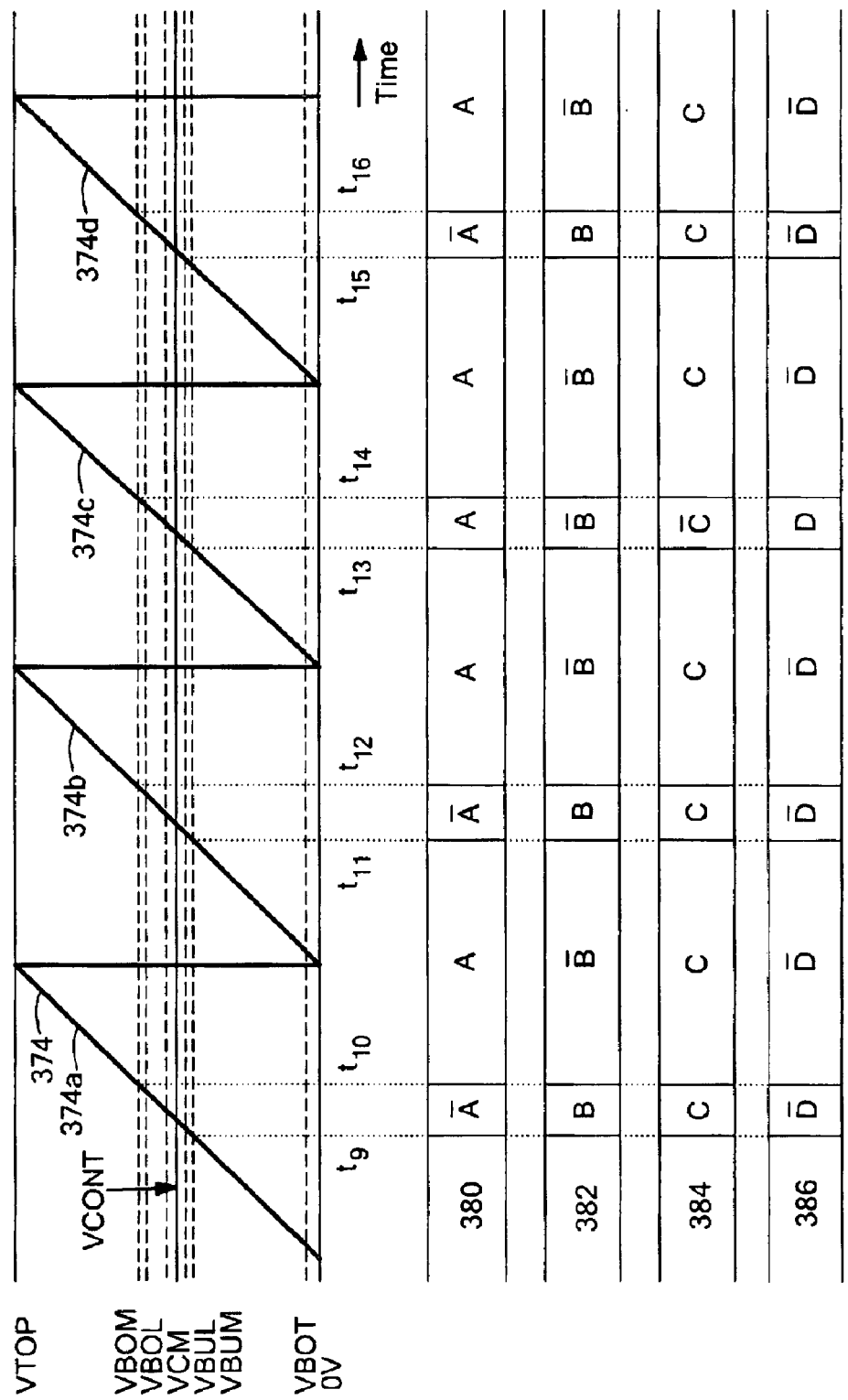
FIG. 8A is another pictorial showing a periodic sawtooth waveform and switch operations associated with the switching regulator of FIGS. 4 and 5 when operated in a buck-boost mode with the error amplifier output voltage at a second level.

Referring now to FIG. 8A, the buck-boost mode of operation is further described in connection with a periodic sawtooth waveform 374, substantially identical to waveform 344 of FIG. 8 and DC voltages VTOP, VBOM, VBOL, VCM, VBUL, VBUM, VBOT, 0V. The voltage VCONT is the error voltage corresponding to the error signal VCONT shown in FIGS. 4 and 5. Four rows 380–386 illustrate conditions of the four switches A–D, respectively (FIGS. 4, 5).

FIG. 8A differs from FIG. 8 in that a different output voltage condition is shown. Specifically, in FIG. 8A, the output voltage $V_{out}$, is slightly higher than the desired $V_{out}$.

Again, the times t9, t11, t13, and t15 correspond to the times at which the periodic sawtooth waveform 374 crosses the DC reference voltage, VBUM. The times t10, t12, t14, and t16 correspond to the times at which the periodic sawtooth waveform 374 crosses the DC reference voltage VBOM.

As noted above, when error voltage VCONT is between the reference voltages VBOL and VBUL as shown, the regulator operates in a buck-boost mode of operation, as occurs when the input voltage $V_{in}$ (FIGS. 4, 5) is substantially equal to the regulated output voltage $V_{out}$ (FIGS. 4, 5). In FIG. 8A, the error voltage VCONT is less than the reference voltage VCM, corresponding to the output voltage $V_{out}$ being slightly higher than a desired output voltage $V_{out}$. In the buck-boost mode of operation, when VCONT substantially equals, but is less than VCM as shown in FIG. 8A, between times t9 and t10, the switch state is BC, corresponding to closed switches B and C. Between times t10 and t11, the switch state is AC, corresponding to closed switches A and C. Between times t11 and t12, the switch state is again BC. Between times t12 and t13, the switch state is again AC. Between times t13 and t14, the switch state is AD, corresponding to closed switches A and D. Therefore, switching states follow a pattern of BC, AC, BC, AC, AD. It can be seen that the switching regulator having VCONT below VCM provides more BC states (i.e., buck cycles) than AD states (i.e., boost cycles). It will become apparent from the discussion below that when in the buck-boost mode of operation, i.e., for VCONT between VBOL and VBUL, the farther VCONT is below VCM, the greater the number of AC to BC state transitions compared to AC to AD state transitions. Stated differently, the greater the output voltage $V_{out}$ relative to the desired $V_{out}$, the more buck cycles as compared to boost cycles.

In operation, as the error signal VCONT increases within the range of VBOL and VBUL, the periods t9–t10, t10–t11, t11–t12, t12–t13, t13–t14, t14–t15, and t15–t16 do not change. Therefore, the error signal VCONT does not alter the relative amount of time in a given cycle of the waveform 374, or the duty cycle, spent in each of the three switch states BC, AC, and AD. Instead, the duty cycle is fixed by the slope of the periodic sawtooth waveform 374 and by the DC reference voltages VBOM and VBUM. Illustrative fixed duty cycles for the three switch states are as noted above in conjunction with FIG. 8.

Figure 8B:
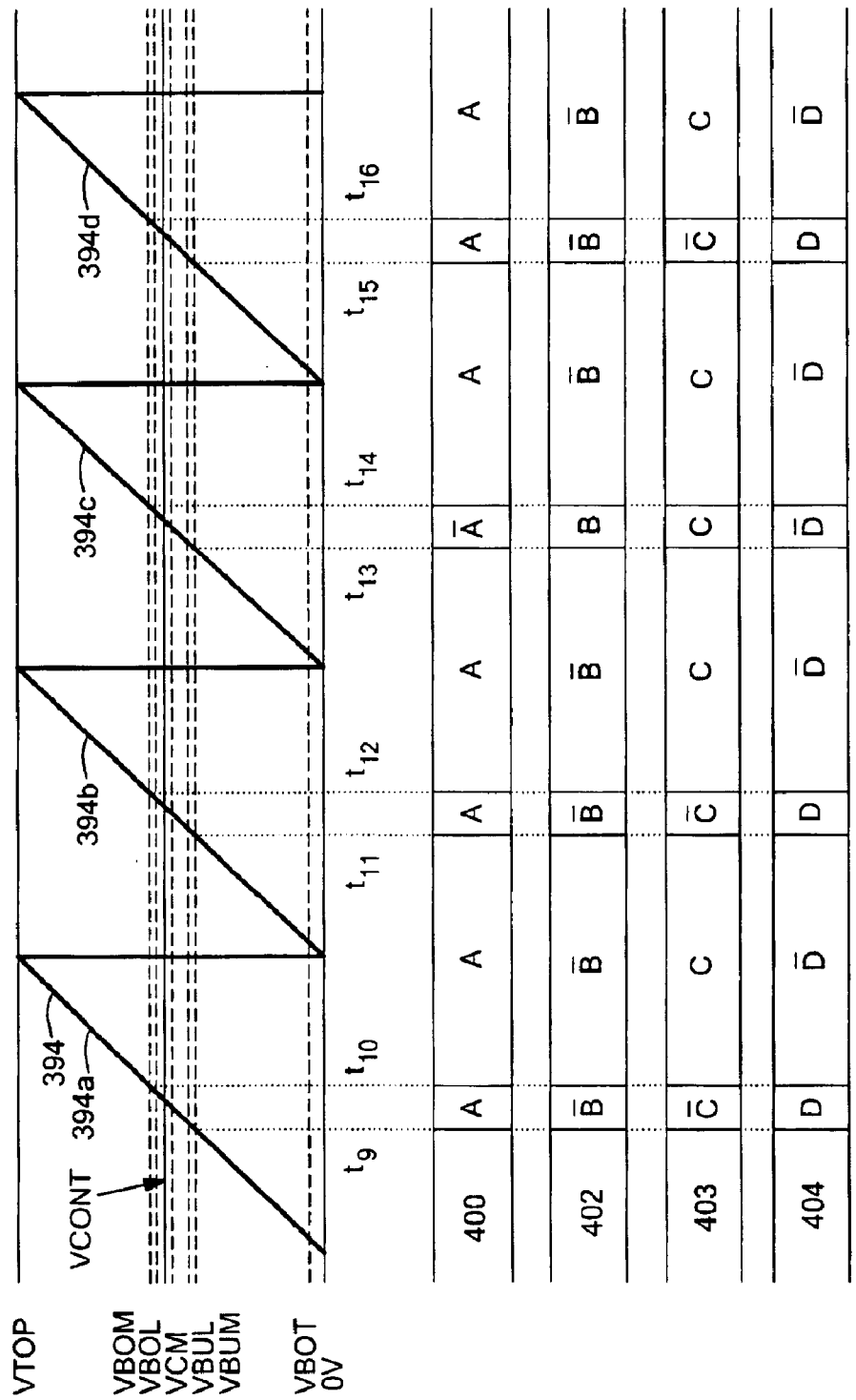
FIG. 8B is yet another pictorial showing a periodic sawtooth waveform and switch operations associated with the switching regulator of FIGS. 4 and 5 when operated in a buck-boost mode with the error amplifier output voltage at a third level.

Referring now to FIG. 8B, the buck-boost mode of operation is further described in connection with a periodic sawtooth waveform 394 substantially identical to waveform 344 of FIG. 8 and DC voltages VTOP, VBOM, VBOL, VCM, VBUL, VBUM, VBOT, 0V. The voltage VCONT is an error voltage corresponding to the error signal VCONT shown in FIGS. 4 and 5. Four rows 400–404 illustrate conditions of the four switches A–D, respectively (FIGS. 4, 5).

FIG. 8B differs from FIG. 8 in that a different output voltage condition is shown. Specifically in FIG. 8B, the output voltage $V_{out}$ is slightly lower than the desired $V_{out}$.

As noted above, the times t9, t11, t13, and t15 correspond to the times at which the periodic sawtooth waveform 394 crosses the DC reference voltage VBUM. The times t10, t12, t14, and t16 correspond to the times at which the periodic sawtooth waveform 394 crosses the DC reference voltage VBOM.

When error voltage VCONT is between the reference voltages VBOL and VBUL as shown, the regulator operates in the buck-boost mode of operation. As described above, this condition occurs when the input voltage $V_{in}$ (FIGS. 4, 5) is substantially equal to the regulated output voltage $V_{out}$ (FIGS. 4, 5). In FIG. 8B, the error voltage VCONT is greater than the reference voltage VCM, corresponding to the output voltage $V_{out}$ being slightly lower than a desired output voltage $V_{out}$. In the buck-boost mode of operation, when VCONT substantially equals, but is greater than VCM as shown in FIG. 8B, between times t9 and t10, the switch state is AD, corresponding to closed switches A and D. Between times t10 and t11, the switch state is AC, corresponding to closed switches A and C. Between times t11 and t12, the switch state is again AD. Between times t12 and t13, the switch state is again AC. Between times t13 and t14, the switch state is BC, corresponding to closed switches B and C. Therefore, switching states follow a pattern of AD, AC, AD, AC, BC. It can be seen that the switching regulator provides more AD states (i.e., boost cycles) than BC states (i.e., buck cycles). It will become apparent from discussion below that, when in the buck-boost mode of operation, i.e., for VCONT between VBOL and VBUL, the farther VCONT is above VCM, the greater the number of AC to AD state transitions as compared to AC to BC state transitions. Stated differently, the lower the output voltage $V_{out}$ relative to the desired $V_{out}$, the more boost cycles as compared to buck cycles.

In operation, as the error signal VCONT increases within the range of VBUL and VBOL, the periods t9–t10, t10–t11, t11–t12, t12–t13, t13–t14, t14–t15, and t15–t16 do not change. Therefore, the error signal VCONT does not alter the relative amount of time in a given cycle of the waveform 394, or the duty cycle, spent in each of the three switch states BC, AC, and AD. Instead, the duty cycle is fixed by the slope of the periodic sawtooth signal 394 and by the DC reference voltages VBOM and VBUM. Illustrative fixed duty cycles for the three switch states are as noted above in conjunction with FIG. 8.

Figure 9:
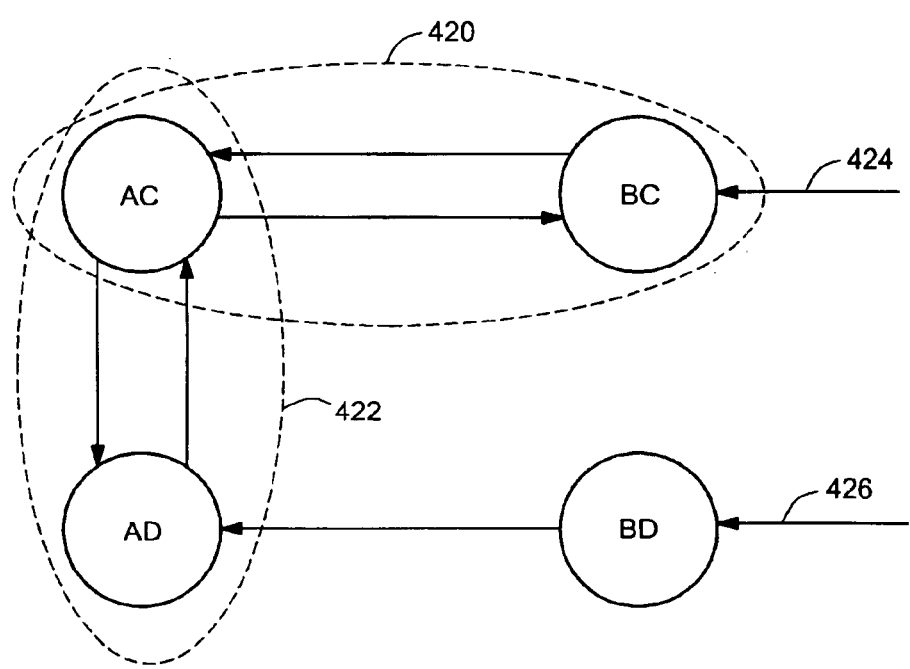
FIG. 9 is a state diagram showing states associated with the switching regulator of FIGS. 4 and 5.

Referring now to FIG. 9, switch states BC, AC, AD, and BD are shown as circles, and arrows between the circles represent state transitions. As described above, depending upon the mode of operation, buck mode, boost mode, or buck-boost mode, states transition in a variety of ways. Transitions between a group of states 420 (AC, BC) correspond to buck cycles in the buck mode of operation as described in conjunction with FIG. 6 and transitions between a group of states 422 (AC, AD) correspond to boost cycles in the boost mode of operation as described in conjunction with FIG. 7.

It should also be apparent that switch state transitions AC to BC and AC to AD in combination correspond to buck-boost cycles in the buck-boost mode of operation as described in conjunction with FIGS. 8, 8A, and 8B. Furthermore, it should also be apparent that switch state transitions AC to BC and AC to AD in the buck-boost mode of operation correspond to a combination of buck cycles and boost cycles respectively, and various combinations of buck and boost cycles are described in conjunction with FIGS. 8, 8A, and 8B, depending upon whether VCONT is substantially equal to VCM, less than VCM, or greater than VCM.

Also shown in FIG. 9, a fourth state BD, in which switches B and D are closed and switches A and C are open, can be arrived at via a path 426 directly from any other state upon certain error conditions described below. In the state BD, the switching regulator, for example switching regulator 200 of FIG. 5, is essentially shut down, passing no current from the input voltage $V_{in}$ to the output of the switching regulator. Similarly, the state BC can be arrived at via a path 424 directly from any other state upon certain error conditions described below.

Figure 10:
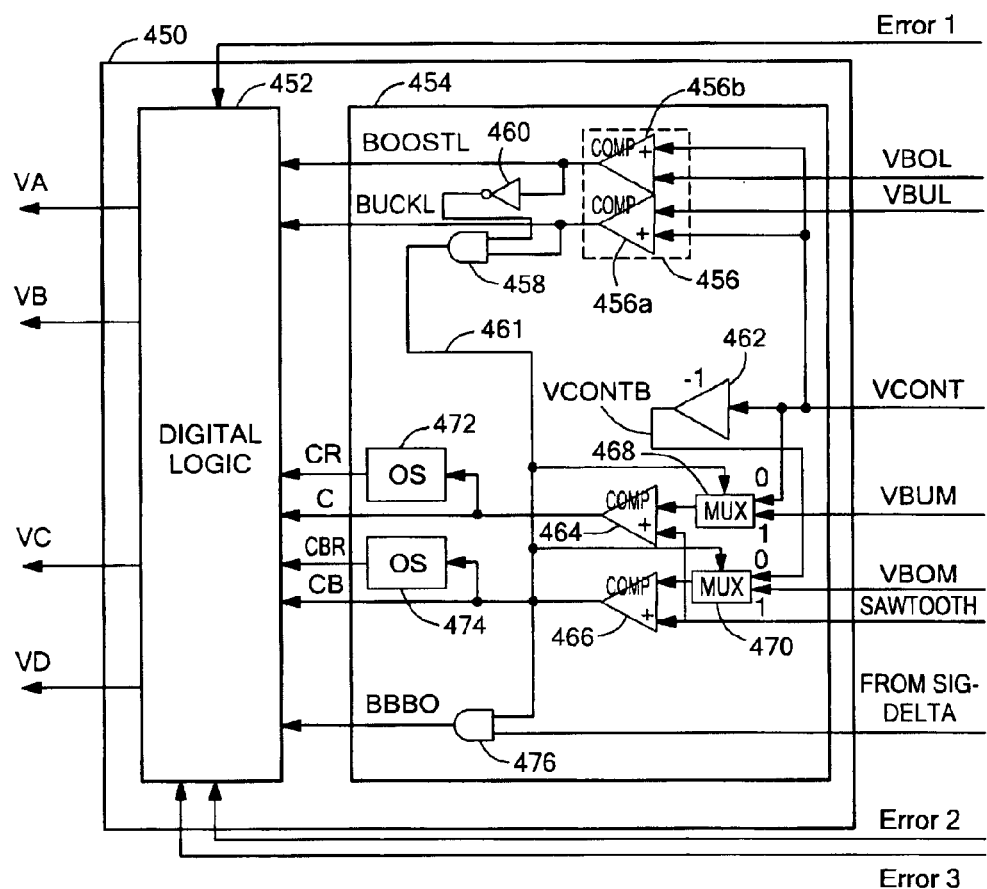
FIG. 10 is a block diagram of a switch logic circuit forming part of the circuit of FIG. 5.

Referring now to FIG. 10, a switch logic circuit 450 corresponding to switch logic circuit 134 of FIG. 5 is shown. The switch logic circuit 450 determines the mode of operation of switching regulator (e.g., 200, FIG. 5), for example, buck mode, boost mode, or buck-boost mode, and controls switches (e.g., A, B, C, D, FIG. 5) accordingly.

The switch logic circuit 450 includes a comparator portion 454 having a window comparator 456 comprising comparators 456a and 456b. The window comparator 456 receives the signals VBOL and VBUL (FIGS. 5–8, 8A, 8B), which are DC voltage signals. The window comparator 456 also receives the error signal VCONT (FIG. 5). Outputs of the comparators 456a, 456b are combined in logic gates 458, 460 to provide a control output 461 which is low when VCONT is not between VBOL and VBUL, indicating that switching regulator 200 (FIG. 5) should be in either the buck mode or the boost mode of operation (see, for example, FIGS. 6 and 7). Conversely, a high control output 461 indicates that VCONT is between VBOL and VBUL and that switching regulator 200 should be in the buck-boost mode of operation corresponding to FIGS. 8, 8A, and 8B.

An analog inverter 462 generates the VCONTB signal, which is an inversion of the error signal VCONT as described above. Operation of comparators 464 and 466 is described further in conjunction with FIGS. 11–13, 13A, and 13B. Let it suffice to say here that depending upon the control signal 461, the comparators 464 and 466 either compare the periodic sawtooth waveform (e.g., 133, FIG. 5) with VCONT and VCONTB or they compare the periodic sawtooth waveform with VBUM and VBOM. Signals C and CB are generated by the above comparisons, regardless of the state of the control signal 461. One-shot circuits 472, 474, also referred to as monostable multivibrators, generate signals CR and CBR respectively, each of which is a pulse having a pulse width controlled by a respective one-shot circuit 472, 474.

Logic gate 476 passes the signal from the sigma-delta converter (136, FIG. 5) to provide a BBBO signal when the control signal 461 is high. When the control signal 461 is low, the BBBO signal is statically low.

The switch logic circuit 450 also includes digital logic 452 that receives the signals BOOSTL, BUCKL, CR, C, CBR, CB, BBBO, error1, error2, and error3 (FIGS. 5–8, 8A, 8B, error3 not shown) and performs logical operations upon those signals corresponding to Boolean operations described below. The logical operations result in switch control signals $V_A$, $V_B$, $V_C$, $V_D$ that control respective switches A, B, C, D (see also FIG. 5) generating switching states described in conjunction with FIGS. 6–8, 8A, 8B, and 9.

The Boolean expressions realized within the digital logic 452 provide transitions from one state to another state, where the states include BC, AC, AD, and BD as indicated in FIG. 9. In one particular embodiment, transitions are performed corresponding to the following expressions, in which an operator "·" will be understood to be an AND operator, an operator "+" will be understood to be an OR operator, and a "→" symbol will be understood to represent a state transition.

AC→BC: CR·$\overline{CB}$·$\overline{BBBO}$

BC→AC: CBR

AC→AD: CBR·$\overline{C}$·$\overline{BBBO}$+BBBO·CR

AD→AC: CR·$\overline{BBBO}$+CBR·C

BD→AD: CBR+BBBO·CR any state→BC: error1 (switch A current has been exceeded)

any state→BD:
  error2 (switch C current in reverse direction has been exceeded) OR
  error 3 (over temperature OR input undervoltage)

The various signals within the above expressions can be identified in FIG. 10, however, inverted signals, for example $\overline{C}$, are generated in the switch logic circuit 450. The above expressions become further understood in view of FIGS. 11–13, 13A, and 13B below. However, in general it should be understood here that logical combinations of the signals CR, C, CBR, CB, BBBO, error1, error2, and error3, shown in FIG. 10, are used to generate the transitions between switch states.

While particular Boolean expressions which describe state transitions are presented above, it should be recognized that other Boolean expressions can achieve essentially the same function.

Figure 11:
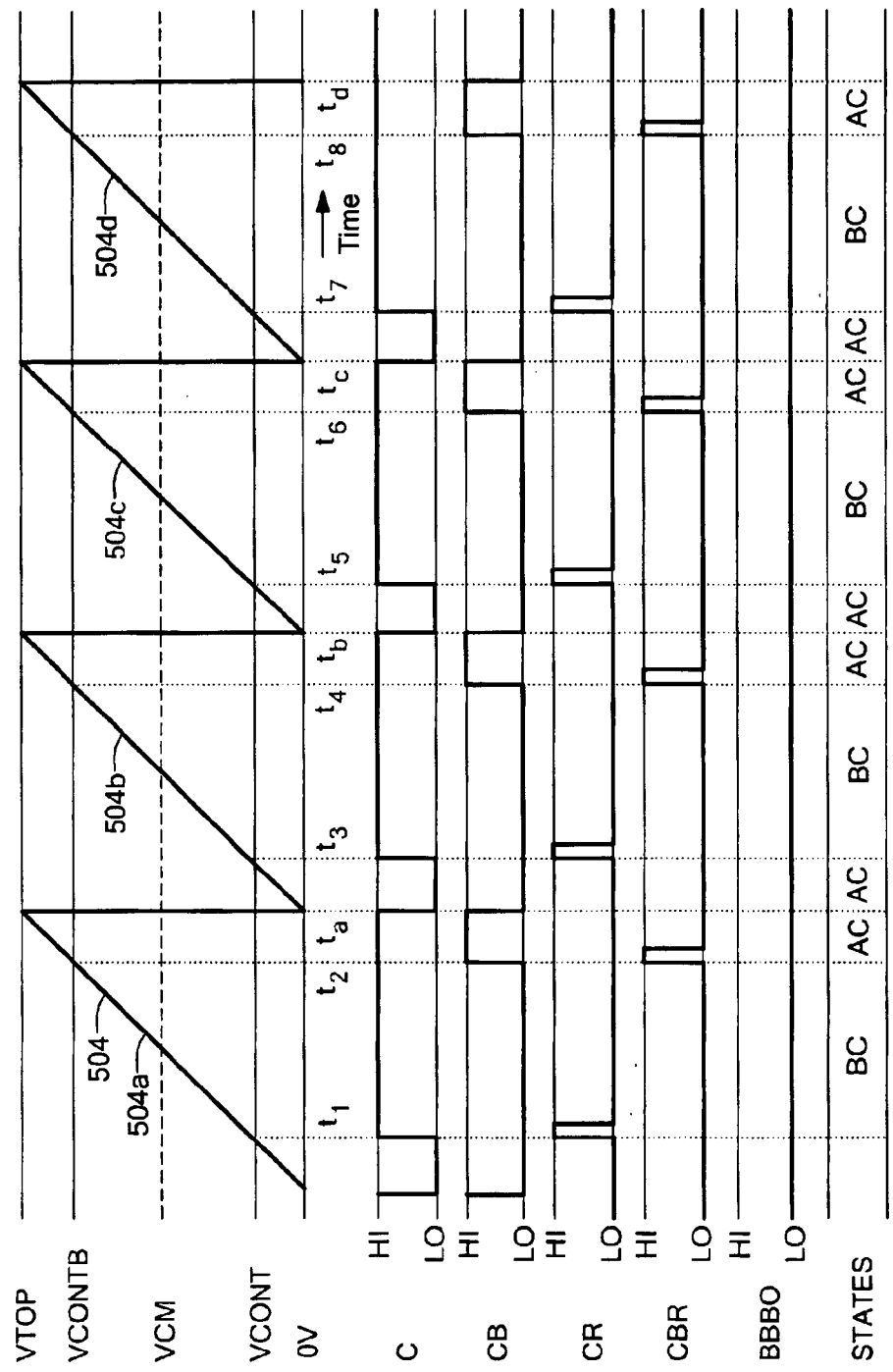
FIG. 11 is a pictorial showing a periodic sawtooth waveform, circuit signals, and switch states associated with the switching regulator of FIGS. 4 and 5 when operated in a buck mode.

Referring now to FIG. 11, the buck mode of operation is illustrated in connection with a periodic sawtooth waveform 504 having a predetermined amplitude and having cycles, of which cycles 504a–504d are but some examples. The periodic sawtooth waveform 504 corresponds to the periodic sawtooth waveform 133 of FIGS. 4 and 5. FIG. 11 also includes the DC voltage VCM (FIGS. 5–8, 8A, 8B). Voltage VCONT is the error voltage corresponding to the error signal VCONT shown in FIGS. 4 and 5. Voltage VCONTB is the inverse of the error voltage VCONT taken about the central voltage VCM. The inversion is described above as the inversion provided by the inverting amplifier 462 shown in FIG. 10. FIG. 11 also shows signals C, CB, CR, CBR, BBBO corresponding to signals shown in FIG. 10. Also shown in a row labeled STATES, are the states of the switches.

Times t1, t3, t5, and t7 correspond to the times at which the periodic sawtooth waveform 504 crosses the lower of VCONT and VCONTB, which is here VCONT. Times t2, t4, t6, and t8 correspond to the times at which the periodic sawtooth waveform 504 crosses the greater of VCONT and VCONTB, which is here VCONTB. Times ta, tb, tc, and td correspond to the times at which the periodic sawtooth waveform 504 has a vertical edge.

The signal C is generated by a comparison of the periodic analog waveform 504 with the error signal VCONT, the signal CB is generated by a comparison of the periodic analog waveform 504 with the inverted error signal VCONTB, the signal CR is a momentary signal, i.e., a one-shot signal, associated with a rising edge of the signal C, and the signal CBR is a momentary signal, i.e., a one-shot signal, associated with a rising edge of the signal CB. As shown, the BBBO signal is statically low. Referring again to FIG. 10, it can be seen that the comparison of the periodic analog waveform 504 with the error signal VCONT is performed by the comparator 464, generating the C signal, and the comparison of the periodic analog waveform 504 with the inverted error signal VCONTB is performed by the comparator 466, generating the CB signal. The signals CR and CBR are generated by the one shot circuits 472 and 474, respectively.

It will be understood that, while the error signal VCONT is below VBUL (not shown), switch states transition in the following order: BC, AC, AC, BC, AC, AC, BC, AC, AC, BC . . . . FIG. 11 shows the same switch state transitions as FIG. 6, and thus corresponds to the buck mode of operation.

Figure 12:
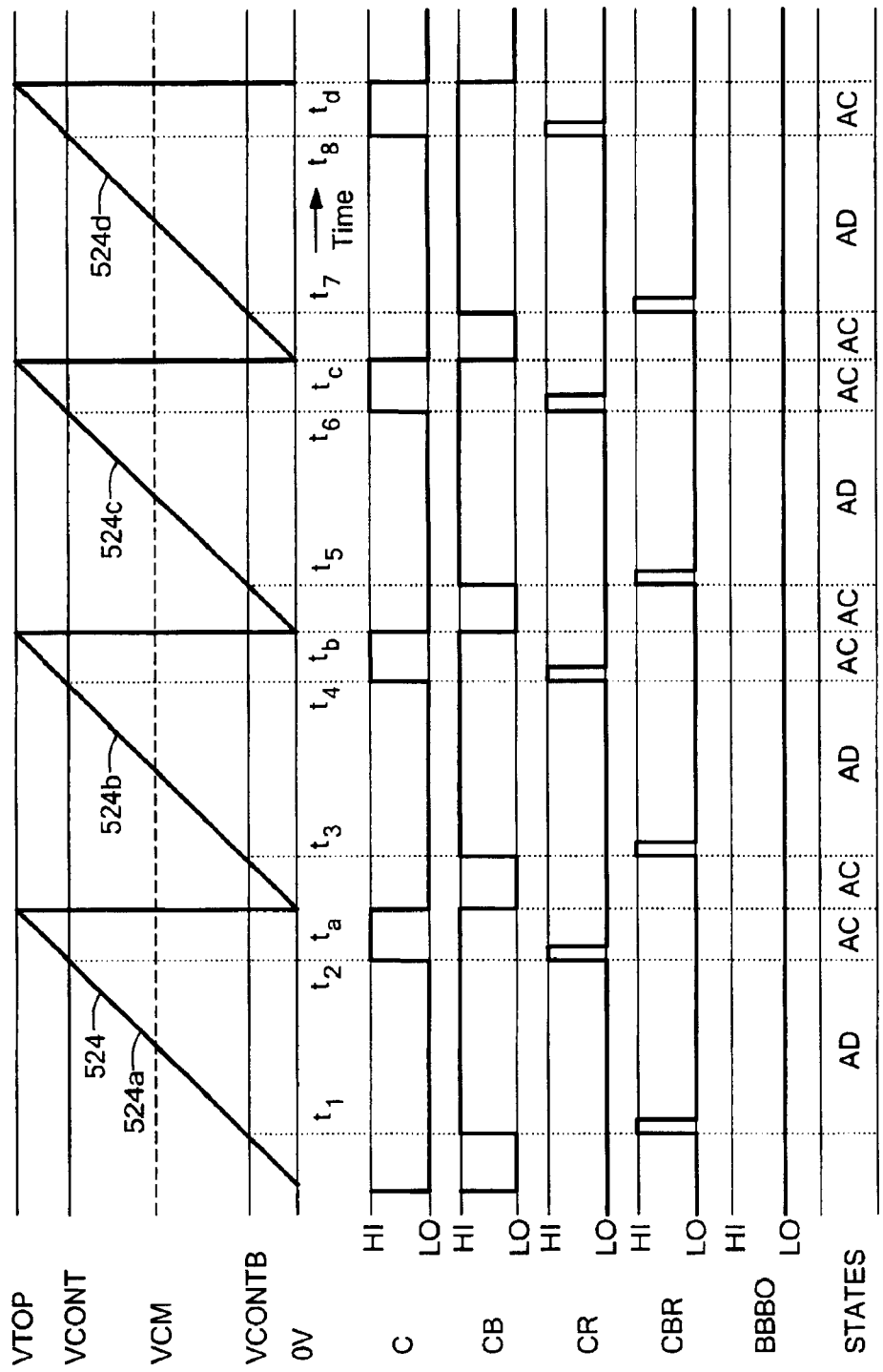
FIG. 12 is a pictorial showing a periodic sawtooth waveform, circuit signals, and switch states associated with the switching regulator of FIGS. 4 and 5 when operated in a boost mode.

Referring now to FIG. 12, the boost mode of operation is illustrated in connection with a periodic sawtooth waveform 524 having a predetermined amplitude and having cycles, of which cycles 524a–524d are but some examples. The periodic sawtooth waveform 524 corresponds to the periodic sawtooth waveform 133 of FIGS. 4 and 5. The chart 520 also includes the DC voltage VCM. Voltage VCONT is the error voltage corresponding to the error signal VCONT shown in FIGS. 4 and 5. Voltage VCONTB is an inverse of the error signal VCONT taken about the central voltage VCM. The inversion is described above as the inversion provided by the inverting amplifier 462 in FIG. 10. The chart 520 also shows signals C, CB, CR, CBR, BBBO corresponding to signals shown in FIG. 10. Also shown, in a row labeled STATES, are the switch states.

Times t1, t3, t5, and t7 correspond to the times at which the periodic sawtooth waveform 524 crosses the lower of VCONT and VCONTB, which is here VCONTB. Times t2, t4, t6, and t8 correspond to the times at which the periodic sawtooth waveform 524 crosses the greater of VCONT and VCONTB, which is here VCONT. Times ta, tb, tc, and td correspond to the times at which the periodic sawtooth waveform 524 has a vertical edge.

It will be understood that, while VCONT is above VBOL (not shown), switch states transition in the following order: AD, AC, AC, AD, AC, AC, AD, AC, AC, AD . . . . FIG. 12 shows the same switch state transitions as FIG. 7, and thus, corresponds to the boost mode of operation.

Figure 13:
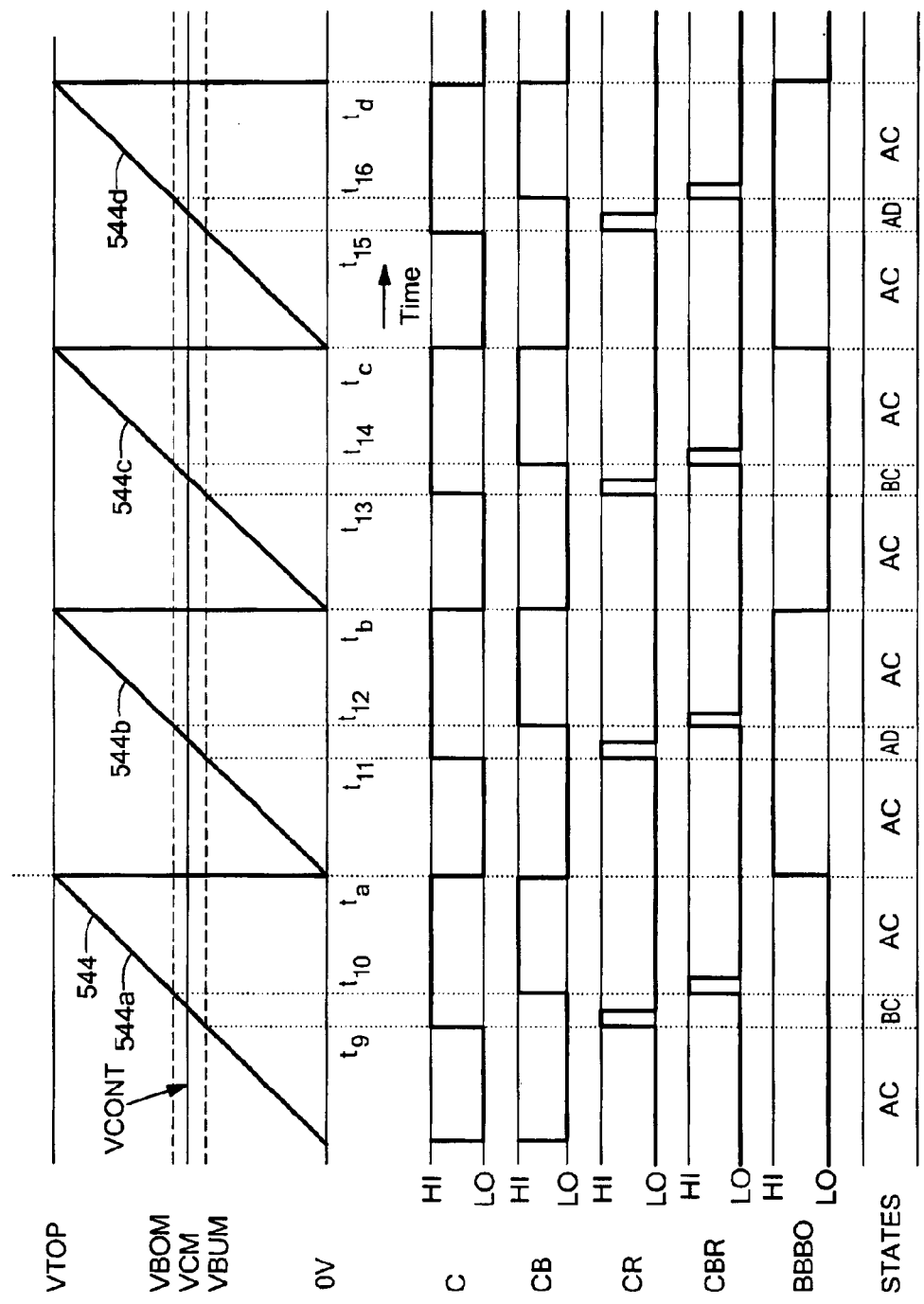
FIG. 13 is a pictorial showing a periodic sawtooth waveform, circuit signals, and switch states associated with the switching regulator of FIGS. 4 and 5 when operated in a buck-boost mode with the regulator output voltage at a first level.

Referring now to FIG. 13, the buck-boost mode of operation is illustrated in connection with periodic sawtooth waveform 544 having a predetermined amplitude and having cycles, of which cycles 544a–544d are but some examples. The periodic sawtooth waveform 544 corresponds to the periodic sawtooth waveform 133 of FIGS. 4 and 5, and can be the same as or similar to the periodic sawtooth waveform 344 of FIG. 8 respectively. The chart 540 also includes the DC voltages VTOP, VBOM, VCM, VBUM, 0V (FIGS. 5–8, 8A, 8B) shown in relation to the periodic sawtooth waveform 544. The voltage VCONT is the error voltage corresponding to the error signal VCONT shown in FIGS. 4 and 5. Also shown in FIG. 13 are signals C, CB, CR, CBR, and BBBO, as well as the switch states, labeled STATES.

Times t9, t11, t13, and t15 correspond to the times at which the periodic sawtooth waveform 544 crosses the DC reference voltage VBUM. Times t10, t12, t14, and t16 correspond to the times at which the periodic sawtooth waveform 544 crosses the DC reference voltage VBOM. Times ta, tb, tc, and td correspond to the times at which the periodic sawtooth waveform 544 has a vertical edge.

It should be appreciated that the signal C is generated by a comparison of the periodic analog waveform 544 with the DC voltage VBUM, the signal CB is generated by a comparison of the periodic analog waveform 544 with the DC voltage VBOM, the signal CR is a momentary signal, i.e., a one-shot signal, associated with a rising edge of the signal C, and the signal CBR is a momentary signal, i.e., a one-shot signal, associated with a rising edge of the signal CB. As shown, the BBBO has two states and corresponds to the output of the sigma-delta converter 136 shown in FIG. 5.

It can be seen that, while the error signal VCONT is substantially equal to VCM, switch states transition in the following order: AC, BC, AC, AC, AD, AC, AC, BC, AC, AC, AD . . . . Comparing FIG. 13 with FIG. 8, it can be seen that FIG. 13, having the same switch state transitions as FIG. 8, corresponds to the buck-boost mode of operation, having three states.

Figure 13A:
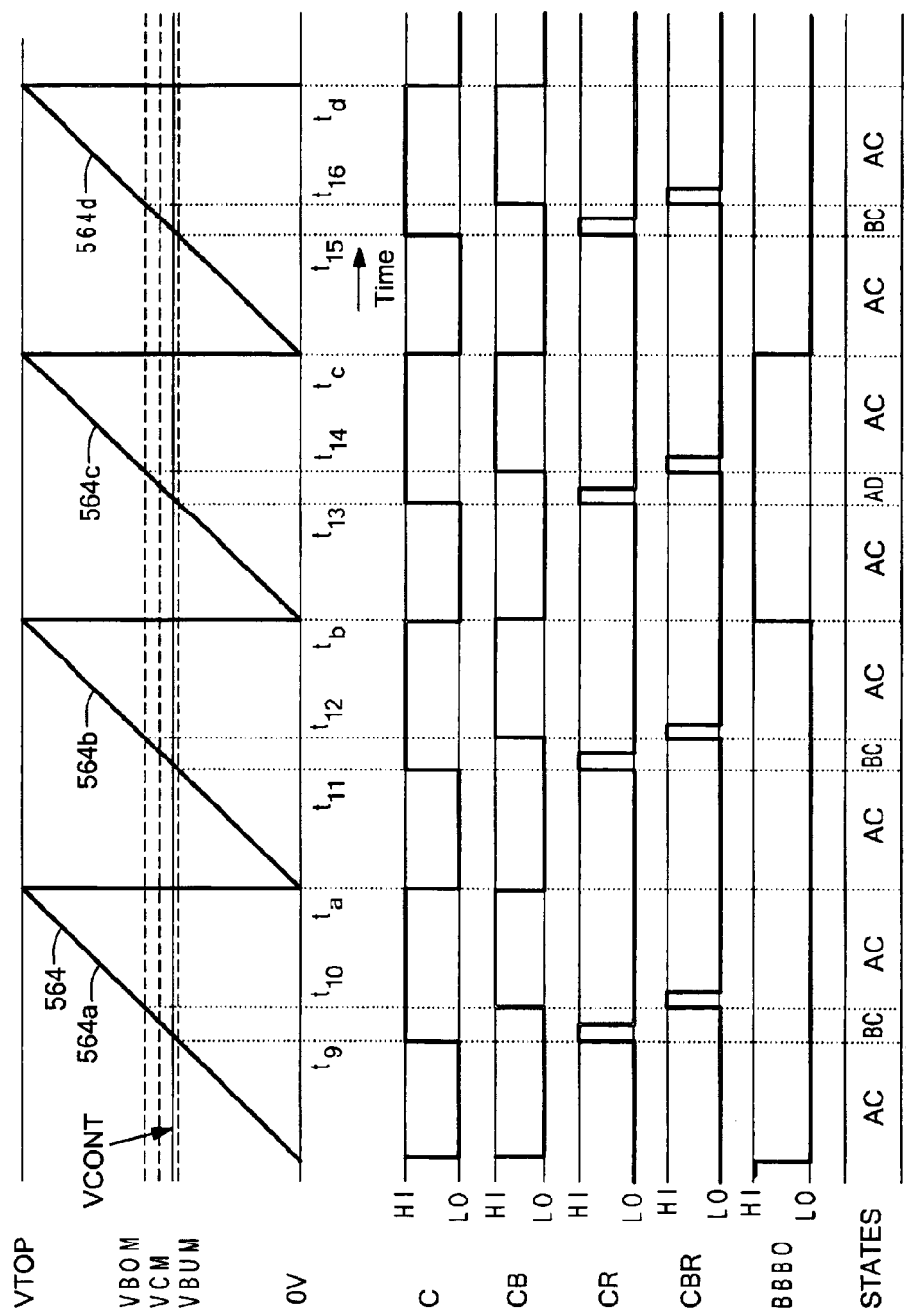
FIG. 13A is another pictorial showing a periodic sawtooth waveform, circuit signals, and switch states associated with the switching regulator of FIGS. 4 and 5 when operated in a buck-boost mode with the regulator output voltage at a second level.

Referring now to FIG. 13A, the buck-boost mode of operation is further illustrated in connection with periodic sawtooth waveform 564 having a predetermined amplitude and having cycles, of which cycles 564a–564d are but some examples. The periodic sawtooth waveform 564 corresponds to the periodic sawtooth waveform 133 of FIGS. 4 and 5, and can be the same as or similar to the periodic sawtooth waveform 374 of FIG. 8A respectively. FIG. 13A includes the DC voltages VTOP, VBOM, VCM, VBUM, 0V (FIGS. 5–8, 8A, 8B) shown in relation to the periodic sawtooth waveform 564. The voltage VCONT is the error voltage corresponding to the error signal VCONT shown in FIGS. 4 and 5. Also shown in FIG. 13A are signals C, CB, CR, CBR, and BBBO, as well as the switch states, labeled STATES.

Times t9, t11, t13, and t15 correspond to the times at which the periodic sawtooth waveform 564 crosses the DC reference voltage VBUM. Times t10, t12, t14, and t16 correspond to the times at which the periodic sawtooth waveform 564 crosses the DC reference voltage VBOM. Times ta, tb, tc, and td correspond to the times at which the periodic sawtooth waveform 564 has a vertical edge.

It should be appreciated that the signal C is generated by a comparison of the periodic analog waveform 564 with the DC voltage VBUM, the signal CB is generated by a comparison of the periodic analog waveform 564 with the DC voltage VBOM, the signal CR is a momentary signal, i.e., a one-shot signal, associated with a rising edge of the signal C, and the signal CBR is a momentary signal, i.e., a one-shot signal, associated with a rising edge of the signal CB. As shown, the signal BBBO has two states and corresponds to the output of the sigma-delta converter 136 shown in FIG. 5.

It can be seen that, while the error signal VCONT is below VCM, switch states transition in the following order: AC, BC, AC, AC, BC, AC, AC, AD, AC, AC, BC . . . . Comparing FIG. 13A with FIG. 8A, it can be seen that FIG. 13A, having the same switch state transitions as FIG. 8A, corresponds to the buck-boost mode of operation having three states.

Figure 13B:
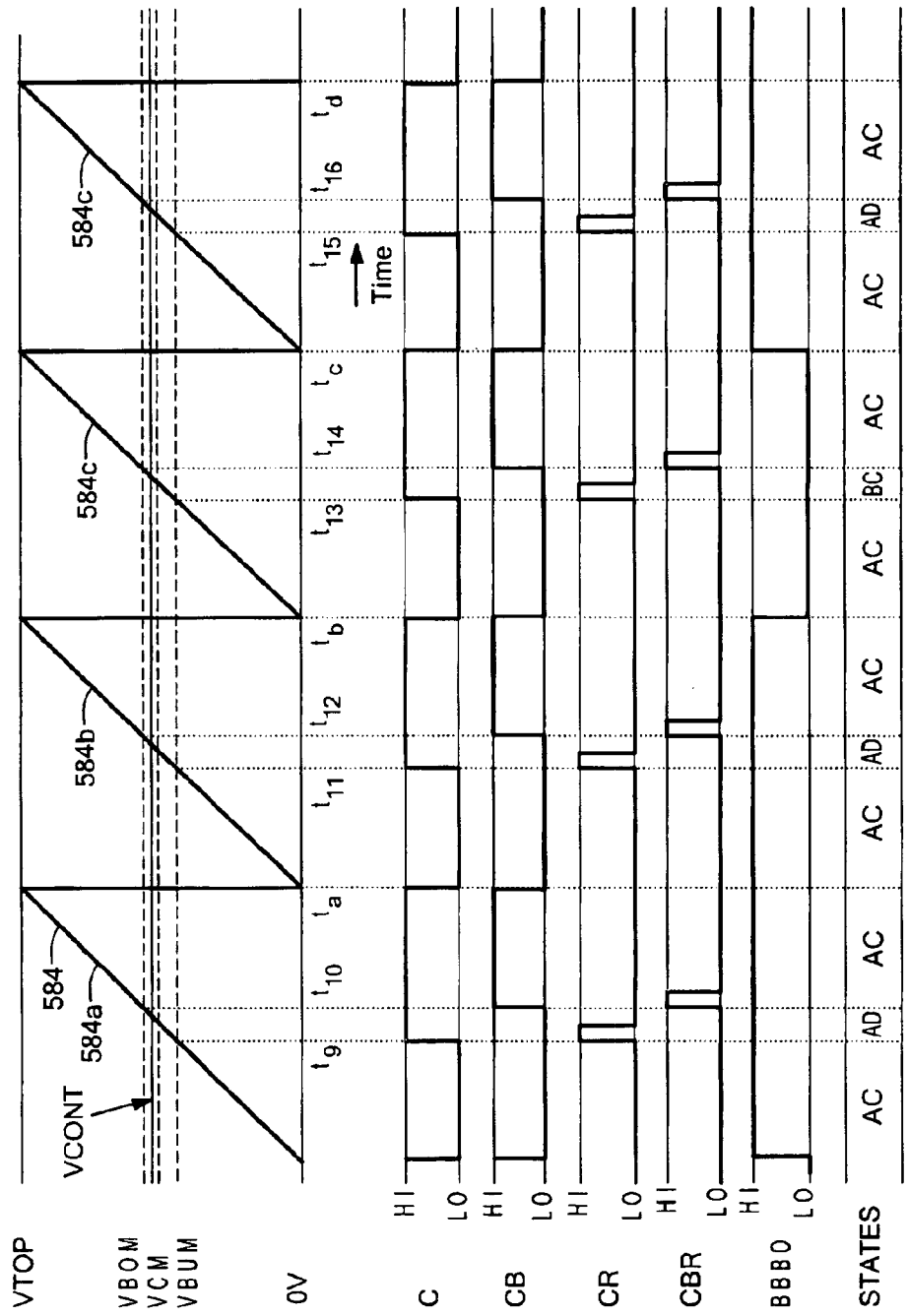
FIG. 13B is yet another pictorial showing a periodic sawtooth waveform, circuit signals, and switch states associated with the switching regulator of FIGS. 4 and 5 when operated in a buck-boost mode with the regulator output voltage at a third level.

Referring now to FIG. 13B, the buck-boost mode of operation is further illustrated in connection with a periodic sawtooth waveform 584 having a predetermined amplitude and having cycles, of which cycles 584a–584d are but some examples. The periodic sawtooth waveform 584 corresponds to the periodic sawtooth waveform 133 of FIGS. 4 and 5, and can be the same as or similar to the periodic sawtooth waveform 394 of FIG. 8B respectively. FIG. 13B also includes the DC voltages VTOP, VBOM, VCM, VBUM, 0V (FIGS. 5–8, 8A, 8B) shown in relation to the periodic sawtooth waveform 584. The voltage VCONT is the error voltage corresponding to the error signal VCONT shown in FIGS. 4 and 5. Also shown in FIG. 13B are signals C, CB, CR, CBR, and BBBO, as well as the switch states, labeled STATES.

Times t9, t11, t13, and t15 correspond to the times at which the periodic sawtooth waveform 584 crosses the DC reference voltage VBUM. Times t10, t12, t14, and t16 correspond to the times at which the periodic sawtooth waveform 584 crosses the DC reference voltage VBOM. Times ta, tb, tc, and td correspond to the times at which the periodic sawtooth waveform 584 has a vertical edge.

It should be appreciated that the signal C is generated by a comparison of the periodic analog waveform 584 with the DC voltage VBUM, the signal CB is generated by a comparison of the periodic analog waveform 584 with the DC voltage VBOM, the signal CR is a momentary signal, i.e., a one-shot signal, associated with a rising edge of the signal C, and the signal CBR is a momentary signal, i.e., a one-shot signal, associated with a rising edge of the signal CB. As shown, the BBBO has two states and corresponds to the output of the sigma-delta converter 136 shown in FIG. 5.

It can be seen that, while the error signal VCONT is above VCM, switch states transition in the following order: AC, AD, AC, AC, AD, AC, AC, BC, AC, AC, AD . . . . Comparing FIG. 13B with FIG. 8B, it can be seen that FIG. 13B, having the same switch state transitions as FIG. 8B, corresponds to the buck-boost mode of operation having three states.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of controlling a switching regulator to supply a regulated output voltage at an output node, the switching regulator comprising an inductor having first and second terminals, a first switch coupled between an input voltage and the first terminal of the inductor, a second switch coupled between the first terminal of the inductor and a first reference voltage, a third switch coupled between the second terminal of the inductor and the output node, and a fourth switch coupled between the second terminal of the inductor and a second reference voltage, the method comprising:

generating a feedback signal proportional to the regulated output voltage of switching regulator;

generating first, second, third and fourth control signals to control the first, second, third, and fourth switches, respectively, in response to the feedback signal and to provide a first state in which the first and third switches are closed and the second and fourth switches are open, a second state in which the second and third switches are closed and the first and fourth switches are open, and a third state in which the first and fourth switches are closed and the second and third switches are open; and adjusting, in a first mode of operation, a number of state transitions from the first state to the second state relative to a number of state transitions from the first state to the third state in response to the feedback signal.

2. The method of claim 1, wherein said adjusting step comprises generating a digital waveform having a pulse rate proportional to the feedback signal.

3. The method of claim 2, wherein the generating the digital waveform comprises generating the digital waveform with a sigma-delta converter.

4. The method of claim 2, wherein said adjusting step further comprises:

generating the first, second, third and fourth control signals to provide transitions between the first state and the second state during a first state of the digital waveform; and generating the first, second, third and fourth control signals to provide transitions between the first state and the third state during a second state of the digital waveform.

5. The method of claim 2, wherein said adjusting step further comprises:

generating a periodic analog waveform having a predetermined amplitude;

comparing the periodic analog waveform with a first fixed voltage to provide a first comparison signal;

comparing the periodic analog waveform with a second fixed voltage to provide a second comparison signal; and logically combining the first comparison signal, the second comparison signal, and the digital waveform to provide the first, second, and third states.

6. The method of claim 5, wherein the periodic analog waveform includes a selected one of a periodic sawtooth waveform and a periodic triangle waveform.

7. The method of claim 1, wherein said generating the first, second, third and fourth control signals further provides a fourth state in which the second and fourth switches are closed and the first and third switches are open in response to an error condition.

8. The method of claim 1, wherein switching regulator is adapted to operate with the input voltage substantially equal to the regulated output voltage in the first mode of operation.

9. The method of claim 1, further comprising adjusting a duration in the first state relative to a duration in the second state in response to the feedback signal in a second mode of operation in which the input voltage is higher than the regulated output voltage.

10. The method of claim 9, further comprising adjusting a duration in the first state relative to a duration in the third state in response to the feedback signal in a third mode of operation in which the input voltage is lower than the regulated output voltage.

11. The method of claim 1, wherein at least one of the second and third switches is a diode.

12. A method of controlling a switching regulator to supply a regulated output voltage at an output node, the switching regulator comprising an inductor having first and second terminals, a first switch coupled between an input voltage and the first terminal of the inductor, a second switch coupled between the first terminal of the inductor and a first reference voltage, a third switch coupled between the second terminal of the inductor and the output node, and a fourth switch coupled between the second terminal of the inductor and a second reference voltage, the method comprising:

generating a feedback signal proportional to the regulated output voltage of switching regulator;

generating a periodic analog waveform; and generating first, second, third and fourth control signals to control the first, second, third, and fourth switches, respectively, in response to the feedback signal and to provide a first state in which the first and third switches are closed and the second and fourth switches are open, a second state in which the second and third switches are closed and the first and fourth switches are open, and a third state in which the first and fourth switches are closed and the second and third switches are open, wherein, in a first mode of operation, a duty cycle of the first state within all periods of the periodic analog waveform corresponds to a first predetermined value, a duty cycle of the second state within periods of the periodic analog waveform in which the second state occurs corresponds to a second predetermined value, and a duty cycle of the third state within periods of the periodic analog waveform in which the third state occurs corresponds to a third predetermined value.

13. The method of claim 12, wherein the first predetermined value is in the range of fifty five percent to ninety-eight percent, and the second and third predetermined values are in the range of two percent to forty-five percent.

14. The method of claim 12, wherein said generating the first, second, third and fourth control signals comprises generating a digital waveform having a pulse rate proportional to the feedback signal.

15. The method of claim 14, wherein the generating the digital waveform comprises generating the digital waveform with a sigma-delta converter.

16. The method of claim 14, wherein said generating the first, second, third and fourth control signals further comprises:

generating the first, second, third and fourth control signals to provide transitions between the first state and the second state during a first state of the digital waveform; and generating the first, second, third and fourth control signals to provide transitions between the first state and the third state during a second state of the digital waveform.

17. The method of claim 14, wherein said generating the first, second, third and fourth control signals further comprises:

generating the periodic analog waveform having a predetermined amplitude;

comparing the periodic analog waveform with a first fixed voltage to provide a first comparison signal;

comparing the periodic analog waveform with a second fixed voltage to provide a second comparison signal; and logically combining the first comparison signal, the second comparison signal, and the digital waveform to provide the first, second, and third states.

18. The method of claim 17, wherein the periodic analog waveform includes a selected one of a periodic sawtooth waveform and a periodic triangle waveform.

19. The method of claim 12, wherein said generating the first, second, third and fourth control signals further provides a fourth state in which the second and fourth switches are closed and the first and third switches are open in response to an error condition.

20. The method of claim 12, wherein switching regulator is adapted to operate with the input voltage substantially equal to the regulated output voltage in the first mode of operation.

21. The method of claim 12, further comprising adjusting a duration in the first state relative to a duration in the second state in response to the feedback signal in a second mode of operation in which the input voltage is higher than the regulated output voltage.

22. The method of claim 21, further comprising adjusting a duration in the first state relative to a duration in the third state in response to the feedback signal in a third mode of operation in which the input voltage is lower than the regulated output voltage.

23. The method of claim 12, wherein at least one of the second and third switches is a diode.

24. A method of controlling a switching regulator to supply a regulated output voltage at an output node, the switching regulator comprising an inductor having first and second terminals, a first switch coupled between an input voltage and the first terminal of the inductor, a second switch coupled between the first terminal of the inductor and a first reference voltage, a third switch coupled between the second terminal of the inductor and the output node, and a fourth switch coupled between the second terminal of the inductor and a second reference voltage, the method comprising:

generating a feedback signal proportional to the regulated output voltage of switching regulator;

generating a periodic analog waveform;

generating first, second, third and fourth control signals to control the first, second, third, and fourth switches, respectively, in response to the feedback signal and to provide a first state in which the first and third switches are closed and the second and fourth switches are open, a second state in which the second and third switches are closed and the first and fourth switches are open, and a third state in which the first and fourth switches are closed and the second and third switches are open, wherein, in a first mode of operation, state transitions consist of a transition from the first state to the second state and a transition from the second state to the first state in a first period of the periodic analog waveform and from the first state to the third state and from the third state to the first state in a second period of the periodic analog waveform.

25. The method of claim 24, wherein said generating the first, second, third and fourth control signals comprises generating a digital waveform having a pulse rate proportional to the feedback signal.

26. The method of claim 25, wherein the generating the digital waveform comprises generating the digital waveform with a sigma-delta converter.

27. The method of claim 25, wherein said generating the first, second, third and fourth control signals further comprises:

generating the first, second, third and fourth control signals to provide transitions between the first state and the second state during a first state of the digital waveform; and generating the first, second, third and fourth control signals to provide transitions between the first state and the third state during a second state of the digital waveform.

28. The method of claim 25, wherein said generating the first, second, third and fourth control signals further comprises:
generating the periodic analog waveform having a predetermined amplitude;
comparing the periodic analog waveform with a first fixed voltage to provide a first comparison signal;
comparing the periodic analog waveform with a second fixed voltage to provide a second comparison signal; and
logically combining the first comparison signal, the second comparison signal, and the digital waveform to provide the first, second, and third states.

29. The method of claim 28, wherein the periodic analog waveform includes a selected one of a periodic sawtooth waveform and a periodic triangle waveform.

30. The method of claim 24, wherein said generating the first, second, third and fourth control signals further provides a fourth state in which the second and fourth switches are closed and the first and third switches are open in response to an error condition.

31. The method of claim 24, wherein switching regulator is adapted to operate with the input voltage substantially equal to the regulated output voltage in the first mode of operation.

32. The method of claim 24, further comprising adjusting a duration in the first state relative to a duration in the second state in response to the feedback signal in a second mode of operation in which the input voltage is higher than the regulated output voltage.

33. The method of claim 32, further comprising adjusting a duration in the first state relative to a duration in the third state in response to the feedback signal in a third mode of operation in which the input voltage is lower than the regulated output voltage.

34. The method of claim 24, wherein at least one of the second and third switches is a diode.

35. A control circuit for controlling a switching regulator to supply a regulated output voltage at an output node, the switching regulator comprising an inductor having first and second terminals, a first switch coupled between an input voltage and the first terminal of the inductor, a second switch coupled between the first terminal of the inductor and a first reference voltage, a third switch coupled between the second terminal of the inductor and the output node, and a fourth switch coupled between the second terminal of the inductor and a second reference voltage, the control circuit comprising:
a feedback amplifier for generating a feedback signal proportional to the regulated output voltage of switching regulator;
a digital waveform generator responsive to the feedback signal for providing a digital waveform having a pulse rate proportional to the feedback signal;
an analog waveform generator for generating a periodic analog waveform having a predetermined amplitude;
at least one comparator for comparing the periodic analog waveform to at least one fixed voltage and for providing a respective at least one comparison output signal; and
logic circuitry responsive to the at least one comparison output signal, and having first, second, third, and fourth control outputs coupled to the first, second, third, and fourth switches respectively, for providing a first state in which the first and third switches are closed and the second and fourth switches are open, a second state in which the second and third switches are closed and the first and fourth switches are open, and a third state in which the first and fourth switches are closed and the second and third switches are open, wherein, in a first mode of operation, said logic circuitry is adapted to adjust a number of state transitions from the first state to the second state relative to a number of state transitions from the first state to the third state in response to the feedback signal.

36. The control circuit of claim 35, further including at least one other comparator for comparing the feedback signal to the periodic analog waveform to provide at least one other comparison output signal, and wherein the logic circuitry is further responsive to the at least one other comparison signal.

37. The control circuit of claim 35, wherein the first, second, third and fourth control signals provide transitions between the first state and the second state during a first state of the digital waveform, and the first, second, third and fourth control signals provide transitions between the first state and the third state during a second state of the digital waveform.

38. The control circuit of claim 35, wherein the digital waveform generator comprises a sigma-delta converter.

39. The control circuit of claim 35, wherein the periodic analog waveform includes a selected one of a periodic sawtooth waveform and a periodic triangle waveform.

40. The control circuit of claim 35, wherein the logic circuitry further provides a fourth state in which the second and fourth switches are closed and the first and third switches are open in response to an error condition.

41. The control circuit of claim 35, wherein switching regulator is adapted to operate with the input voltage substantially equal to the regulated output voltage in the first mode of operation.

42. The control circuit of claim 35, wherein the logic circuitry is further adapted to adjust a duration in the first state relative to a duration in the second state in response to the feedback signal in a second mode of operation in which the input voltage higher is than the regulated output voltage.

43. The control circuit of claim 42, wherein the logic circuitry is further adapted to adjust a duration in the first state relative to a duration in the third state in response to the feedback signal in a third mode of operation in which the input voltage is lower than the regulated output voltage.

44. The control circuit of claim 35, wherein at least one of the second and third switches is a diode.

45. A method of controlling a switching regulator to supply a regulated output voltage at an output node, the switching regulator comprising an inductor having first and second terminals, a first switch coupled between an input voltage and the first terminal of the inductor, a second switch coupled between the first terminal of the inductor and a first reference voltage, a third switch coupled between the second terminal of the inductor and the output node, and a fourth switch coupled between the second terminal of the inductor and a second reference voltage, the method comprising:
generating a feedback signal proportional to the regulated output voltage of switching regulator;
generating a periodic analog waveform; and
generating first, second, third and fourth control signals to control the first, second, third, and fourth switches, respectively, in response to the feedback signal and to provide a first state in which the first and third switches are closed and the second and fourth switches are open, a second state in which the second and third switches are closed and the first and fourth switches are open, and a third state in which the first and fourth switches are closed and the second and third switches are open, wherein during a single period of the periodic analog waveform, switches are in a selected two of the first, second, and third states.

46. The method of claim 45, wherein a number of state transitions from the first state to the second state are adjusted relative to a number of state transitions from the first state to the third state in response to the feedback signal.

47. The method of claim 45, wherein a duty cycle of the first state within all periods of the periodic analog waveform corresponds to a first predetermined value, a duty cycle of the second state within periods of the periodic analog waveform in which the second state occurs corresponds to a second predetermined value, and a duty cycle of the third state within periods of the periodic analog waveform in which the third state occurs corresponds to a third predetermined value.

48. The method of claim 45, wherein state transitions consist of a transition from the first state to the second state and a transition from the second state to the first state in a first period of the periodic analog waveform and from the first state to the third state and from the third state to the first state in a second period of the periodic analog waveform.

* * * * *

UNITED STATES PATENT AND TRADEMARK OFFICE
CERTIFICATE OF CORRECTION

PATENT NO. : 6,984,967 B2
APPLICATION NO. : 10/696230
DATED : January 10, 2006
INVENTOR(S) : Notman It is certified that error appears in the above-identified patent and that said Letters Patent is hereby corrected as shown below:

Column 7, line 25 delete "fifty five" and replace with --fifty-five--

Column 14, line 27 delete "operator "-" " and replace with --operator "·"--.

Column 22, line 44 delete "input voltage higher is than the" and replace with --input voltage is higher than the--.

Signed and Sealed this

Nineteenth Day of September, 2006

JON W. DUDAS
*Director of the United States Patent and Trademark Office*